United States Patent
Oehlsen

(10) Patent No.: US 9,439,347 B2
(45) Date of Patent: Sep. 13, 2016

(54) MANUAL LAWNMOWER DECK GUARD POSITIONER

(71) Applicant: Michael Oehlsen, Charles Town, WI (US)

(72) Inventor: Michael Oehlsen, Charles Town, WI (US)

(*) Notice: Subject to any disclaimer, the term of this patent is extended or adjusted under 35 U.S.C. 154(b) by 582 days.

(21) Appl. No.: 13/868,038

(22) Filed: Apr. 22, 2013

(65) Prior Publication Data

US 2013/0276419 A1 Oct. 24, 2013

Related U.S. Application Data

(60) Provisional application No. 61/636,018, filed on Apr. 20, 2012.

(51) Int. Cl.
| | |
|---|---|
| *A01D 67/00* | (2006.01) |
| *A01D 34/00* | (2006.01) |
| *A01D 34/82* | (2006.01) |
| *A01D 75/18* | (2006.01) |
| *A01D 34/71* | (2006.01) |

(52) U.S. Cl.
CPC ............ *A01D 34/006* (2013.01); *A01D 34/71* (2013.01); *A01D 34/828* (2013.01); *A01D 75/182* (2013.01)

(58) Field of Classification Search
CPC .... A01D 34/81; A01D 34/828; A01D 75/18; A01D 75/182; A01D 75/71; A01D 34/82; A01D 34/006; A01D 34/712; A01D 2101/00; F16G 15/10; F16G 15/14; F16G 15/04
USPC ......... 56/320.2, 320.1, 17.4, DIG. 24, 10.2 J
See application file for complete search history.

(56) References Cited

U.S. PATENT DOCUMENTS

| | | | | |
|---|---|---|---|---|
| 2,269,980 A | * | 1/1942 | MacDonald | A01D 34/07 180/53.1 |
| 2,299,841 A | * | 10/1942 | Moyer | A01D 34/06 56/10.3 |
| 2,578,880 A | * | 12/1951 | Doyle | A01D 34/63 180/19.1 |
| 2,777,272 A | * | 1/1957 | Smith | A01D 34/661 172/59 |
| 2,970,422 A | * | 2/1961 | Kroll | A01D 43/063 56/202 |
| 2,971,313 A | * | 2/1961 | Smart, Jr. | A01D 43/063 56/202 |
| 3,222,856 A | * | 12/1965 | Haynes | A01D 51/00 172/34 |
| 3,269,101 A | * | 8/1966 | Reynolds | A01D 43/063 56/202 |
| 3,404,519 A | * | 10/1968 | Demers | A01D 34/828 56/14.7 |
| 3,462,923 A | * | 8/1969 | Yeske | A01D 75/185 56/16.3 |

(Continued)

*Primary Examiner* — Thomas B Will
*Assistant Examiner* — Joan D Misa
(74) *Attorney, Agent, or Firm* — Symbus Law Group, LLC; Clifford D. Hyra

(57) ABSTRACT

An apparatus for raising and lowering a mower deck guard/chute includes a platform attachment assembly configured for attachment to a movable platform, a housing mount configured to be attached to a riding machine surface, and a linkage assembly having a break-away safety mechanism and configured to connect the platform attachment assembly to the housing mount and to thereby hold the movable platform in a variably raised position. The break-away safety mechanism is configured to break the connection between the platform attachment assembly and the housing mount when a tensile force is applied to the linkage assembly due to snagging or entanglement of the deck guard and/or apparatus.

19 Claims, 28 Drawing Sheets

(56) References Cited

U.S. PATENT DOCUMENTS

| | | | | |
|---|---|---|---|---|
| 3,496,707 A | * | 2/1970 | Kobey | A01D 34/63 56/17.5 |
| 4,107,907 A | * | 8/1978 | Rutherford | A01D 34/828 56/17.4 |
| 4,378,668 A | * | 4/1983 | Gullett | A01D 34/4168 56/12.7 |
| 4,466,235 A | * | 8/1984 | Cole | A01D 34/81 56/16.9 |
| 4,854,112 A | * | 8/1989 | Holley | A01D 75/30 172/269 |
| 5,018,239 A | * | 5/1991 | Dobric | A01D 34/001 15/328 |
| 5,040,364 A | * | 8/1991 | Deegan | A01D 43/0631 56/320.2 |
| 5,133,175 A | * | 7/1992 | Dumbrell | A01D 34/828 56/17.4 |
| D366,264 S | * | 1/1996 | Eberlin | D15/17 |
| 5,826,417 A | * | 10/1998 | Evans | A01D 34/828 56/17.4 |
| 6,178,729 B1 | * | 1/2001 | Vastag | A01D 34/005 56/17.5 |
| 6,698,544 B2 | * | 3/2004 | Kurtgis | A62B 35/0075 182/145 |
| D530,095 S | * | 10/2006 | Herzberg | D3/327 |
| 7,448,195 B2 | * | 11/2008 | Kohler | A01D 34/71 56/320.2 |
| 7,594,379 B2 | * | 9/2009 | Nicholson | A01D 34/71 56/320.2 |
| 8,468,788 B1 | * | 6/2013 | Vastag | A01D 34/81 56/17.5 |
| D700,630 S | * | 3/2014 | Davis | D15/17 |
| 8,675,823 B2 | * | 3/2014 | Hooten | A62B 35/04 182/3 |
| 2004/0128970 A1 | * | 7/2004 | Gazlay | A01D 34/71 56/320.2 |
| 2009/0301050 A1 | * | 12/2009 | Kohler | A01D 34/71 56/320.2 |
| 2012/0067019 A1 | * | 3/2012 | Luking | A01D 34/71 56/320.2 |
| 2014/0346798 A1 | * | 11/2014 | Chou | B60R 13/0206 296/1.08 |

* cited by examiner

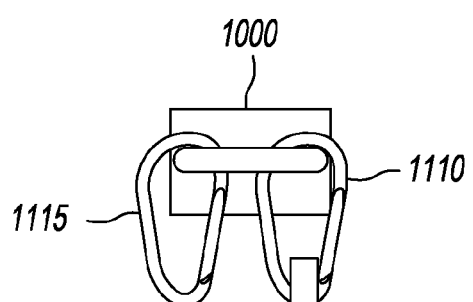
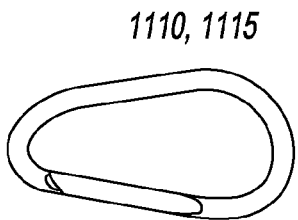
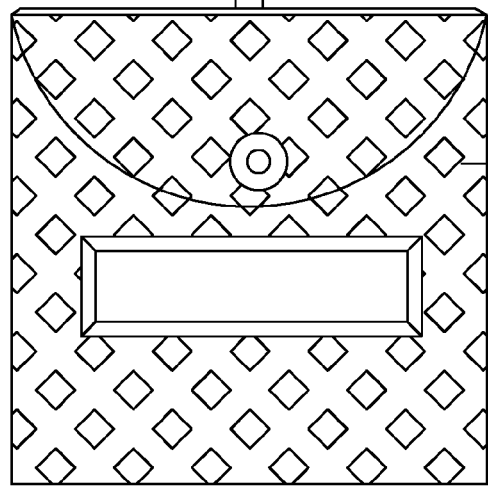
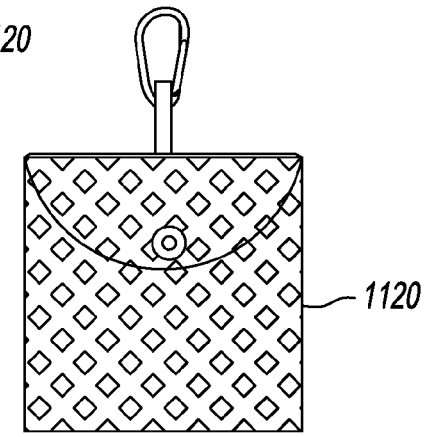
FIG. 11B
FIG. 11A
FIG. 11C

| SIZE | A | B | C | D | E | TENSILE |
|---|---|---|---|---|---|---|
| 1.5"(6MM) | 1 1/2" | 3/4" | 7/32" | 1" | 3/8" | 182 LBS |

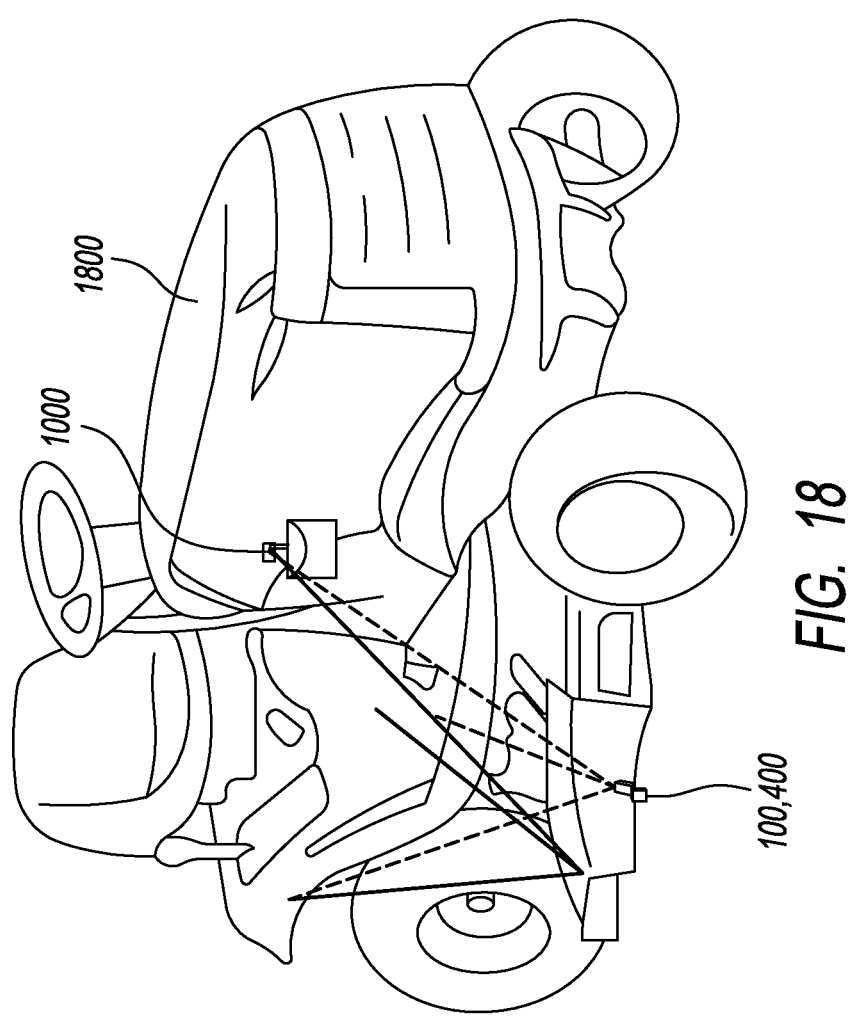

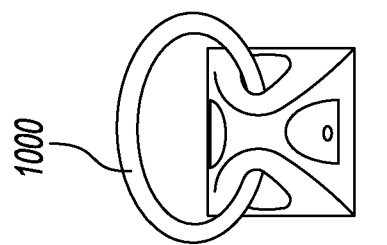
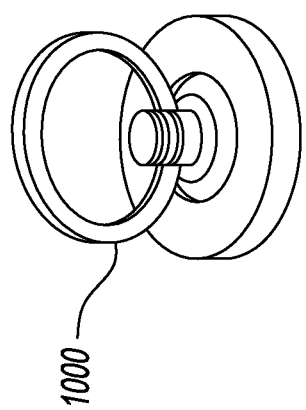
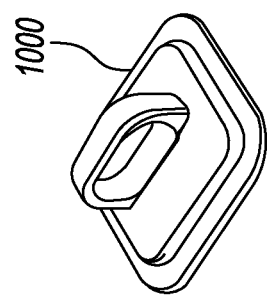
FIG. 22

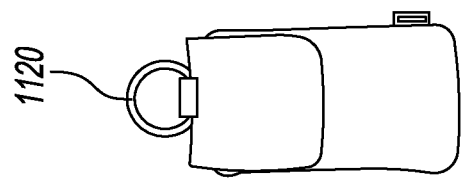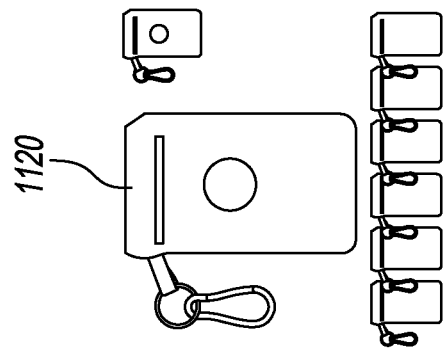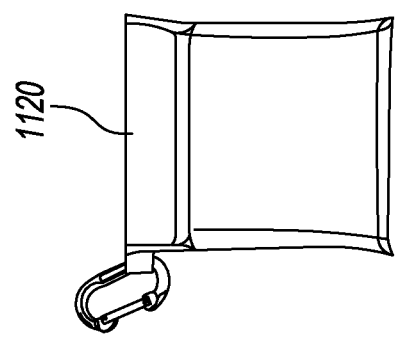
FIG. 23

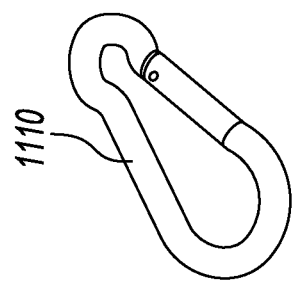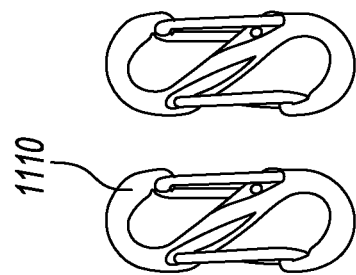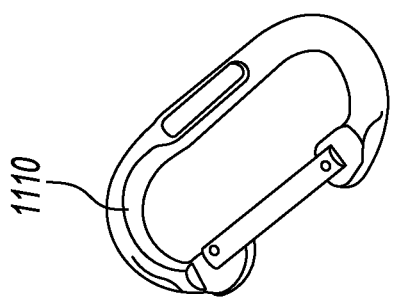
FIG. 24

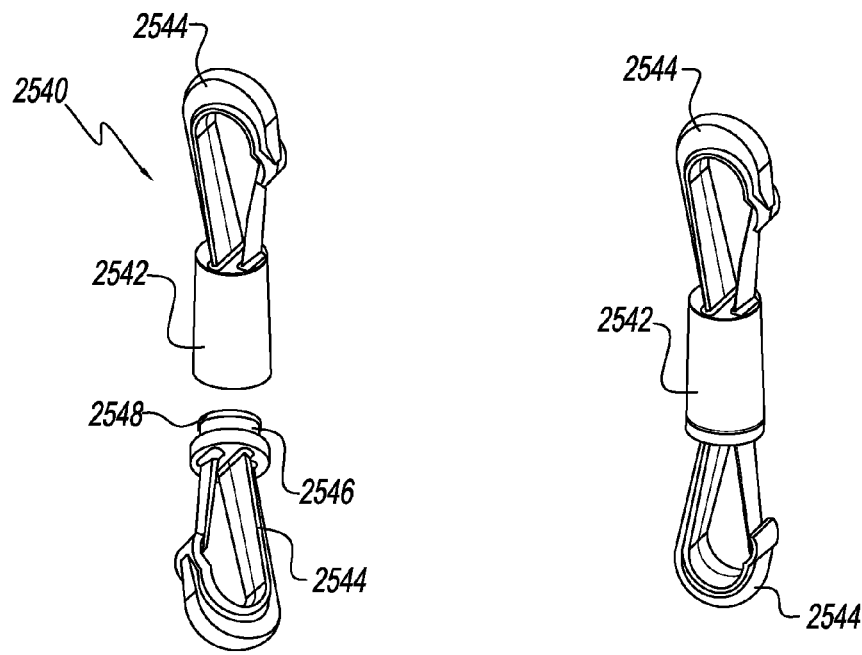
FIG. 27A
FIG. 27B
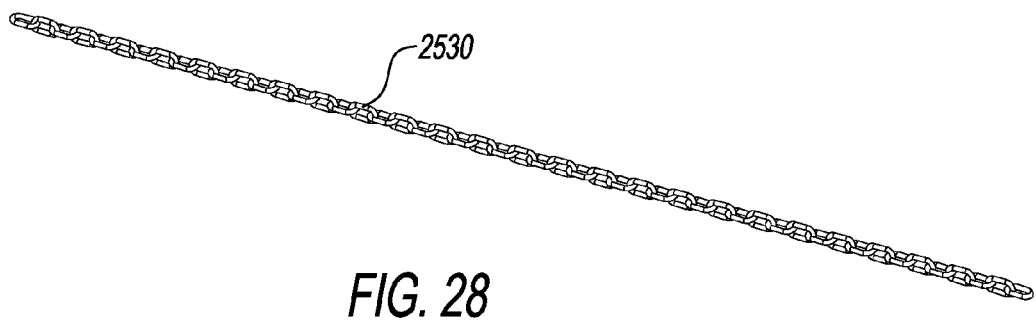
FIG. 28

MANUAL LAWNMOWER DECK GUARD POSITIONER

This application claims the benefit of U.S. Provisional Application No. 61/636,018, filed Apr. 20, 2012, which is hereby incorporated by reference in its entirety.

FIELD

Example embodiments relate to methods and systems for mechanically raising and lowering a platform. More specifically, embodiments relate to a system of clips, clamps, and chains for manually raising and lowering a device for deflecting debris from a powered lawn machine, such as a lawnmower deck guard (sometimes referred to as a "chute").

BACKGROUND

Devices, such as a riding lawn mower, are typically equipped with a spring-loaded mechanism to automatically lower a platform, such as a deck guard. However, other lever-controlled mechanical or electro-mechanical powered systems are available for manually raising and lowering a deck guards. These devices may be expensive and/or cumbersome for use on a smaller device. Further, it is common that a person may practice unsafe acts regarding the use of the discharge guard of the lawn mower while a mower blade system is engaged. For example, a person may clear the discharge guard by raising a deck guard utilizing a person's hand or foot, and, in some cases, manually raise the guard into the raised position permanently by means of a strap or bungee without the option or ability to lower the guard back to the normal (safe) position easily or without dismounting the mower.

More so, platforms of devices, such as the deck guard of a lawn mower, may hit or catch objects when trying to cut or pass through tight spaces. This may damage the mower, the deck guard, or the object involved in the collision. Accordingly, methods, systems and apparatuses are needed that are more affordable, easy to use, and maintain safety features required for use.

SUMMARY

Example embodiments relate to a mechanical system of clips, clamps, and chains used to manually raise and lower a platform. For example, in one embodiment, the system may be used to raise and lower the deck guard of a lawn mower.

More so, embodiments may be directed towards a system attached to a standard riding and zero-radius turn style mower. Embodiments may also be equipped with a safety release mechanism configured such that a linkage assembly may disengage in the event of snagging or entanglement. Embodiments may comprise a subset of pieces or units that if assembled together, may incorporate a manually controlled mechanical system used to raise and lower the guard of a lawn mower deck.

Further, example embodiments may be configured to temporarily, briefly, momentarily, perpetually, continuously or permanently raise the guard deck of a lawn mower. For example, the deck guard may be raised indefinitely while moving the mower into or through tight spaces (e.g., gates, trailer loading for transport, garage doors, storage/warehouses and the like). In other example embodiments, the deck guard may be raised temporarily to allow the clearing or blowing out of debris of a clogged chute area, edging on the guard side of the mower, or maneuvering through tight spaces.

An example embodiment may include a platform attachment assembly configured for attachment to a movable platform, a housing mount configured to be attached to a riding machine surface, and a linkage assembly having a break-away safety mechanism and configured to connect the platform attachment assembly to the housing mount and to thereby hold the movable platform in a raised position. The break-away safety mechanism may be configured to break the connection between the platform attachment assembly and the housing mount when a tensile force of is applied to the linkage assembly due to snagging or entanglement. The break-away safety mechanism is designed to break apart before forces resulting from an entanglement or collision would result in permanent damage to the deck guard or platform raising and lowering apparatus. However, it will not ordinarily break away due to normal weight of a deck guard and bumps and jostling from driving a mower over uneven terrain, which result in forces well short of the level that would result from most collisions and entanglements. The safety mechanism may be designed to accept minor entanglements, such as from light vegetation, without breaking away, as the forces resulting from such entanglements may be well below those with the potential to cause permanent damage.

Many deck guards have a spring force of 0.7 to 1.2 lbs, which therefore represents a minimum linear break-away force for break-away safety mechanisms in embodiments configured for use with such deck guards. To prevent damage to other parts of the deck guard positioner or lawn care machinery, in embodiments the linear break-away force is below a force that could damage the next weakest part of the deck guard positioner and/or mower or other lawn care machine. The linear break-away force in embodiments is also low enough that break-away occurs before the force generated could cause a safety hazard by, for example, directing the mower or other machine in an unintended direction or tipping the mower or other machine. A linear break-away force of four pounds or less generally will achieve those objectives, and therefore some embodiments of the break-away safety mechanism have a linear break-away force of four pounds or less. Some embodiments of the break-away safety mechanism have a linear break-away force of 2.0-2.5 lbs, which accommodates the spring force of most if not all riding mowers and normal jostling during operation, while breaking away well before any potential for damage to another deck guard positioner element or lawn mower part, and before any hazardous situation could be created by tipping or redirection of a mower, in most circumstances.

Linear break-away force for a break-away safety mechanism can be adjusted in some embodiments by varying the shape, material, dimensions, and number of grooves and corresponding ridges in the two halves of a break-away mechanism. For example, smaller and softer ridges require less linear force to be pulled from corresponding grooves.

In some embodiments, the movable platform is a lawnmower deck guard and the riding machine surface is the outer surface of a lawnmower.

In some embodiments, the platform attachment assembly includes a clamp assembly configured to be clamped to an edge of the movable platform. The clamp assembly may have alligator teeth to prevent accidental dislodgement of the clamp assembly from the movable platform. The clamp assembly may be U-shaped.

In some embodiments, the linkage assembly is configured to raise the movable platform attached to the platform attachment assembly connected to the linkage assembly when pulled away from the platform attachment assembly and towards the housing mount and when the movable platform is in a less than fully raised position.

In some embodiments, the linkage assembly is configured to lower the movable platform attached to the platform attachment assembly connected to the linkage assembly when moved towards the platform attachment assembly and away from the housing mount and when the movable platform is in a less than fully lowered position.

In some embodiments, the break-away safety mechanism includes a safety box having a first surface having a first hole configured to removably receive a first latching mechanism and a second surface having a second hole configured to fixedly receive a second latching mechanism. The first latching mechanism may be configured to be operatively connected to the housing mount via the linkage assembly. The second latching mechanism may be configured to be operatively connected to the platform attachment assembly.

In some embodiments, a storage bag is configured to attach to the housing mount and to store at least a portion of the linkage assembly.

In some embodiments, the housing mount is attached to the riding machine surface with an adhesive.

In some embodiments, the break-away safety mechanism connects the linkage assembly to the platform attachment assembly.

In some embodiments, the break-away safety mechanism includes first and second clips facing in opposite directions and removably connected at their bases. The first clip base may have an opening and at least one of a groove and a lip and the second clip base may have a portion configured to be inserted in the opening and having at least one of a groove and a lip configured to mate with the at least one of a groove and a lip of the first clip base.

In some embodiments, the linkage assembly includes a double-sided clip connecting the linkage assembly to the housing mount. The linkage assembly may include chain links. The linkage assembly may connect to the housing mount and the platform attachment assembly with clips.

In some embodiments, the housing mount has an attachment loop configured to secure the linkage assembly.

A new riding lawn care machine has a movable platform and an apparatus for raising and lowering a deck guard as described above.

A new movable platform positioning method includes the steps of attaching a platform attachment assembly to a movable platform, attaching a housing mount to a riding machine surface, and connecting the platform attachment assembly to the housing mount with a linkage assembly having a break-away safety mechanism and thereby holding the movable platform in a raised position. The break-away safety mechanism is configured to break the connection between the platform attachment assembly and the housing mount when a tensile force is applied to the linkage assembly as a result of snagging or entanglement. The linkage assembly may be pulled away from the platform attachment assembly and towards the housing mount, thereby raising the movable platform. The linkage assembly may be moved towards the platform attachment assembly and away from the housing mount, thereby lowering the movable platform.

An example embodiment may include a clamp assembly having a first portion configured to be disposed on a deck guard, and a second portion configured to be operatively connected to a safety break-away device. Further, the example embodiment may include the safety box having a first surface with a first hole being configured to receive a first latching mechanism, and a second surface with a second hole being configured to receive a second latching mechanism, wherein the first latching mechanism is removable connected within the first hole, and the second latching mechanism is fixed within the second hole and is configured to be operatively connected to the clamp assembly. Alternatively, a safety clip system with a pressure sensitive snap may also be utilized to achieve the same action mechanism of release. Also, an example embodiment may include a housing mount configured to be disposed on a vehicle and operatively connected to the first latching mechanism.

In a further embodiment, the clamp assembly is U-shaped. In another embodiment, the safety box further comprises a rubber septum portion disposed on an inner surface of the first surface, and the rubber septum portion includes the first hole.

In another embodiment, the first latching mechanism is operatively connected to the housing mount via a chain link or double clip linking device.

In another embodiment, the deck guard is configured to move from a first position to a second position if force is applied on the chain link in a first direction, the first direction being from the clamp towards the housing mount.

In another embodiment, the first position is a lowered position, and the second position is a raised position. In another embodiment, the deck guard is configured to move from a second position to a first position if force is applied on the chain link in a second direction, the second direction being from the housing mount towards the clamp.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIGS. 11A-C depict a mower housing mount mounted onto a first surface, a first carabineer, and a second carabineer supporting a storage pouch according to an example embodiment.

FIG. 18 depicts different locations for attaching the deck guard clamp assembly and/or the mower housing mount on a deck guard and a mower according to an example embodiment.

FIG. 22 depicts various shapes and sizes that may be used for an attachment clip according to an example embodiment.

FIG. 23 depicts various shapes and sizes that may be used for a bag according an example embodiment.

FIG. 24 depicts various shapes and sizes that may be used for carabineers according to an example embodiment.

FIGS. 27A-B depict a break-away safety snap clip according to an example embodiment.

FIG. 28 depicts a linkage chain according to an example embodiment.

DETAILED DESCRIPTION OF THE DRAWINGS

Figure 1:
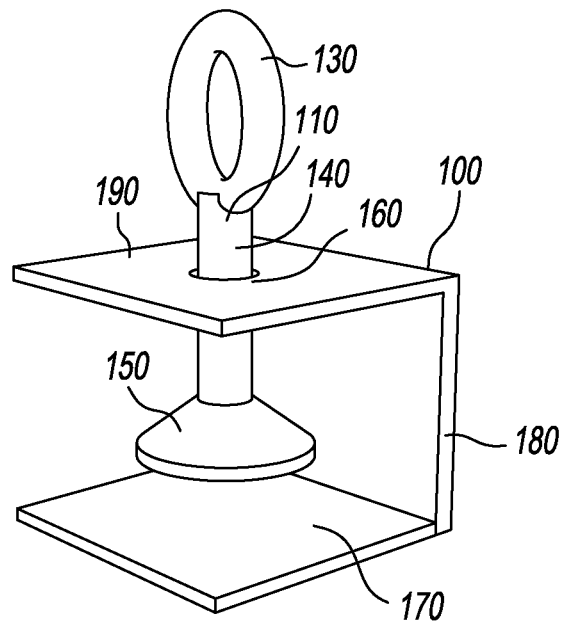
FIG. 1 depicts a deck guard clamp assembly according to an example embodiment.
Figure 2A:
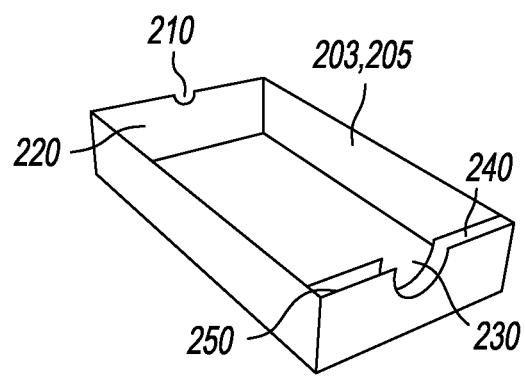
FIGS. 2A-2D depict various views of a safety release assembly according to example embodiments.
Figure 2B:
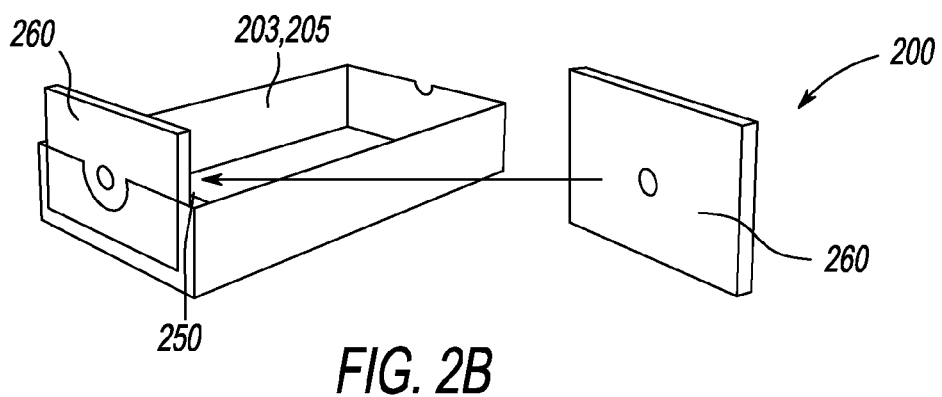
Figure 2C:
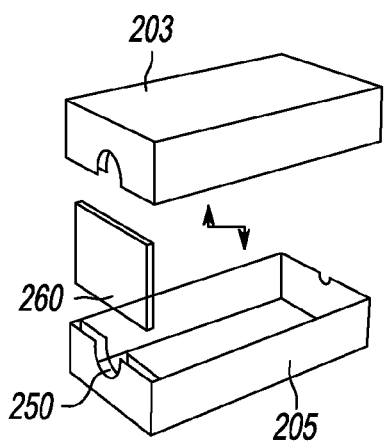
Figure 2D:
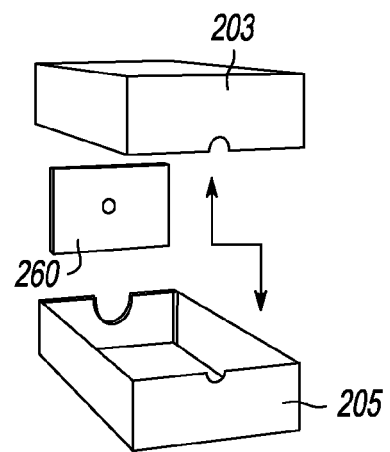

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments relate to a mechanical system of one or more clips, clamps and/or chains used to manually raise and lower a platform. For example, in one embodiment, the system may be used to raise and lower the deck guard of a lawn mower. Accordingly, although the following example embodiments relate to raising and lowering a deck guard of a lawn mower for brevity and clarity, it should be understood that other embodiments may be directed to fully or incrementally raise, lift, elevate, descend or lower any platform attached or adjacent to any device.

Lawn mowers, such as riding lawn mowers may vary in size and design. Commercial size riding mowers, both tractor style and zero-radius turn mowers, may be equipped with a lever-controlled mechanical or electro-mechanical powered system for raising and lowering a discharge guard. These devices may be expensive and cumbersome on smaller, residential size riding mowers or other smaller apparatus requiring or desiring a lever-controlled or electro-mechanical powered lever. Further, a person may practice unsafe acts regarding the discharge guard of the lawnmower if the mower blade system is engaged. For example, a person may attempt to clear the discharge chute by hand or the deck guard may be raised by a foot or hand of the person to attempt to clear debris.

Also, the deck guard may hit or catch on objects if trying to cut or pass through tight spaces, which may damage the mower, deck guard, and/or the object involved in the collision. Moreover, the deck guard/discharge chute may project debris into unwanted areas or directions when edging or trimming if the opposite side of the mower deck faces the edging area. Therefore, by raising the deck guard to a desired height, the operator may maneuver the mower to edge cut on the same side as the discharge chute. In other words, if the deck guard is raised the space consumed by the mower may be reduced, minimized or limited while allowing for edging on the same side as the discharge chute.

In various example embodiments, an operator may leave or position the deck guard in a lowered position with a deck guard clamp assembly attached, pull a chain taut and attach the chain to a chain latch and the deck guard clamp assembly. Then, the operator may manually raise the guard if desired, required or needed by hand. The guard may also be raised and the chain re-attached to the chain latch to keep the guard in a permanently, indefinitely or fixed raised position if safe to do so, or the blade power system of the lawn mower is disengaged. Therefore, example embodiments may be configured to reduce, limit or eliminate dangerous practices used with a guard deck of a lawnmower, and example embodiments may be configured to adapt the lawn mower into a more space-friendly vehicle or device.

A chain is convenient to use in a latching assembly because any link in the chain may be used to secure the chain to the lawn mower or other fixed surface (via a housing mount attached to the lawn mower or the like). This provides great flexibility in the placement of the housing mount and deck guard clamp assembly, as the chain can be made taut between the housing mount and deck guard clamp assembly regardless of the distance between them (as long as it is less than the overall length of the chain). Shorter distances will utilize a shorter length of chain, with any excess chain stored away (e.g. in a bag) or allowed to hang down into/onto the mower. However, other connectors having like functionality could be utilized. A simple cord is not ideal because it would have to be secured at an intermediate length by tying, which reduces usefulness of the device. However, a cord with a sequence of rings or latch or other connectors along its length could be used interchangeably with a chain.

Turning to FIG. 1, FIG. 1 depicts a deck guard clamp assembly 100. The deck guard clamp assembly 100 may be comprised of a screw 110, such as a plastic screw. Any other material may be used for the screw, but plastic is lightweight and inexpensive and strong and durable enough for the task at hand for lawn mowers.

The screw 110 may include a looped head 130, a threaded portion 140, and a flat-based foot 150. The looped head 130 may be configured to allow for connection with a safety connection clip, such as a carabineer, while the clip maintains a free range of motion about a point of connection or various points of connections at a plurality of instances. In other words, a clip may be connected to different portions of the looped head 130 at different times.

Clip 105 may include two faces 160, 170 that are substantially parallel to each other with a third adjacent face 180 that is substantially perpendicular to faces 160 and 170. At least one of the substantially parallel faces 160, 170 may include a threaded hole 190. The threaded hole 190 may be configured to receive the threaded portion 140 of screw 110.

Clamp assembly 100 may be configured to be mounted on any exposed edge of a platform. For example, the guard of a lawn mower. More specifically, clamp assembly 100 may be mounted on a deck guard by simply sliding the clip 105 over the lip of the guard and screwing screw 110 so base 150 is tightly secured to the guard. This form of attachment results in a secure connection given the forces typically experienced during operation, yet allows for very simple repositioning of the clamp assembly. A user may learn over time which positions lead to greatest ease of use and adapt the positioning accordingly. The device is thus suitable for use with a very wide range of vehicles. In other example embodiments, the faces of the clip 105 may not be substantially u-shaped, but be any form configured to be clipped or tightly secured to a surface.

FIGS. 2A-2D depict various views of safety release assembly 200. Safety release assembly 200 may be comprised of two rectangular half boxes 203, 205 and rubber septum portion 260. Each of the rectangular half boxes 203, 205 may include a first half moon or semicircle 210 disposed on an anterior or first surface 220 of the rectangular half boxes 203, 205, and each of the rectangular half boxes 203, 205 may include a second half moon or semicircle 230 disposed on a posterior or second surface 240 of the rectangular half boxes 203, 205. The two semicircles 210, 220 may be positioned such that when rectangular boxes 203, 205 are adjacent to each other semicircles 210, 220 form completed circles.

Moreover, each of the rectangular half boxes 203, 205 may have a sleeve portion 250 on the posterior or second surface 240, wherein the sleeve portion 250 is configured to receive a septum portion 260. In at least one example embodiment, septum portion 260 may be a rubber septum, however any flexible material may be used (although the degree of flexibility will affect the force that will trigger the safety mechanism). Furthermore, septum portion 260 may have a hole 270 disposed in the center or middle of the septum portion 260.

The two rectangular half boxes 203, 205 may be fused, bonded, attached, merged or welded together, encapsulating, capturing or disposing septum portion 260 in sleeve portion 250 at the anterior or first surface 220. By fusing, bonding, attaching, merging or welding the two half boxes 203, 205 the safety release assembly 200 may be formed with a first full circle disposed within the anterior or first surface 220 and a second full circle disposed within the posterior or second surface 240. In at least one embodiment, the first and second full circles may be different sizes with different diameters. For example in at least one example embodiment, each rectangular half box 203, 205 may be 2"×0.5"×3," the half moon or semicircle 210 within the anterior or first surface 220 may have a diameter of ⅜", the half moon or semicircle 230 within the posterior or second surface 240 may have a diameter of 3/16", and the septum portion 260 may be 15/16"×15/16"×1/8" with a center hole having a 1/8" diameter. In a further example embodiment, the sleeve portion 250 may be 5/32" within the first and second half boxes 203, 205. It should be noted that the above non-limiting dimensions are given by way of example, and each element may have a different shape or size.

Figure 3:
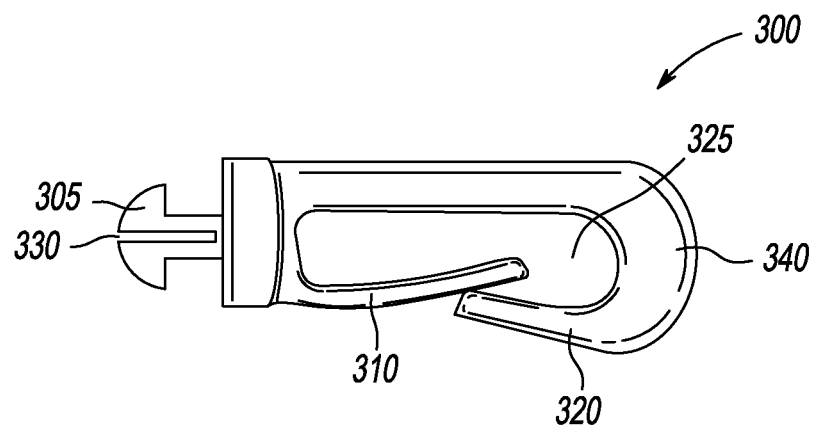
FIG. 3 depicts a plunger-type swivel snap clip with a plunger tip according to an example embodiment.

FIG. 3 depicts a plunger type swivel snap clip 300 with a plunger tip 305. The snap clip 300 may have a clipping mechanism with a flexible elongated portion 310 configured to be pressed or pulled in a first position to allow a chain or object to be inserted within the body 325 of the snap clip 300. In a second position, the flexible elongated portion may be configured to be adjacent to a fixed portion 320 of the clip 300, such that the clip may hold or secure the chain or object in the body 325 of the snap clip 300. In at least one example embodiment, width of a first end of plunger tip 305 may be 1/4", and 5/16" in length, further a base of the plunger tip 330 may have a height of 1/8." In a further example embodiment, a second end 340 of the clip 300 may have a width of "1/2," and a length from the first end of the plunger tip 305 to the second end 340 of the clip 300 may be 1 and "1/2," while the body of the clip has a 7/32" width. It should be noted that the above non-limiting dimensions are given by way of example, and each element of the clip 300 may have a different shape or size.

Figure 4A:
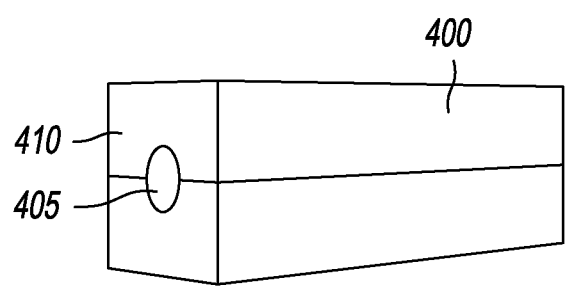
FIGS. 4A and 4B depict a fully assembled safety box according to an example embodiment.
Figure 4B:
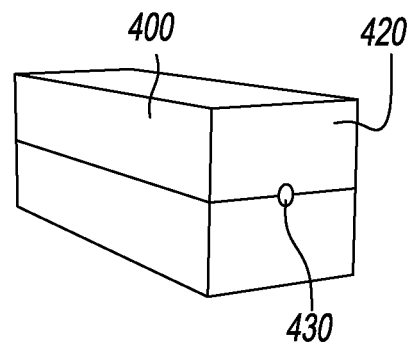

FIGS. 4A and 4B depict a fully assembled safety box 400 composed of the two half boxes 203, 205 in FIG. 2. More specifically, FIG. 4A depicts an anterior or first surface 410 of safety box 400, and FIG. 4B depicts a second surface or posterior 420 of the safety box 400.

As discussed above in FIG. 2, the safety box 400 may be a box with a rubber septum 405 with an aperture on the anterior side 410 of the safety box 400, and a small hole 430 may be within the posterior side 420 of the safety box 400. More so, a first swivel snap clip 300 as discussed above in FIG. 3 may be inserted, placed or disposed through the aperture 405 and a second snap clip 300 may be inserted, placed or disposed through the small hole 430. In a further embodiment, the second snap clip 300 may be permanently attached to the safety box through hole 430, while being configured for free rotation while attached. In an alternative embodiment, a securing ring such as a molded "1/2" ring is on the posterior side 420 of the safety box 400 for attaching to an s-clamp or similar.

Upon applying force on base of the snap clips 300, the plunger tip 305 of the snap clip 300 will penetrate aperture 405 within the septum and hole 430. Upon inserting clip 300 within aperture 405, the physical properties of the septum rubberized material will cause aperture 405 to shut, thus securely holding the plunger tip 405 of the clip 300 inside safety box 400.

Accordingly, this design allows for normal use with applied linear pull force, but also may act as a safety mechanism by allowing, via applied force, a connector chain to be pulled and released from the safety box 400 via clip 300 through aperture 405, resulting in the lowering of the deck guard and/or preventing, limiting or reducing sheer damage caused by snags on the chain assembly. It should be recognized that the plunger/septum safety box arrangement is only one of many possible safety release device embodiments. Any safety device that allows for the platform/guard deck to lower when high forces are encountered (as typically encountered due to a snag, collision, etc.) is suitable for the device. Any device triggered by force or sudden movement to release the tension pulling the deck guard up may be used, for example snaps, shear pins, torsion levers, or springs attached to the connector chain. Any in-line device utilized as a "break-away" to sever the linkage assembly (e.g. chain) upon application of force may be used.

Figure 5A:
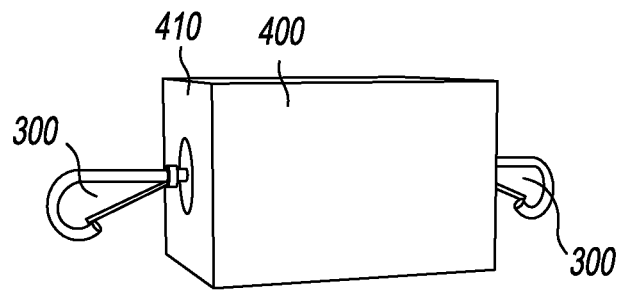
FIGS. 5A and 5B depict a fully assembled safety box with two clips inserted within the box according to an example embodiment.
Figure 5B:
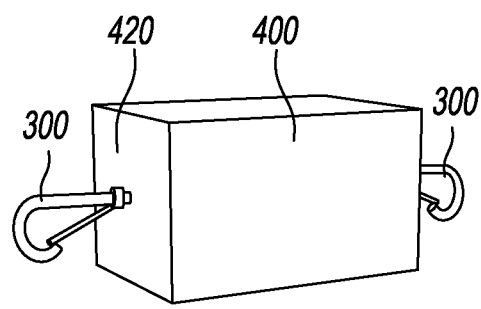
Figure 6A:
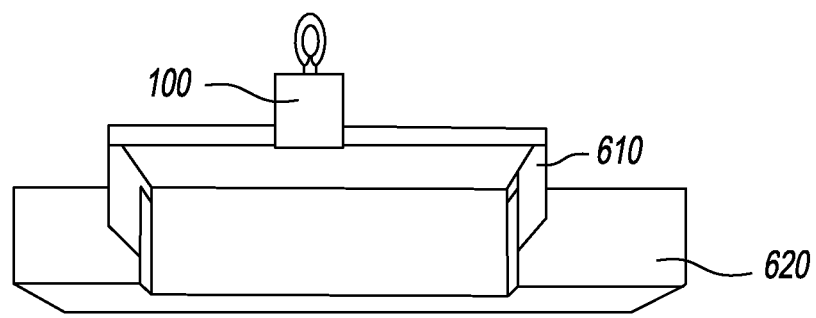
FIGS. 6A-D depict different views of a deck guard clamp assembly attached to deck guard according to example embodiments.
Figure 6B:
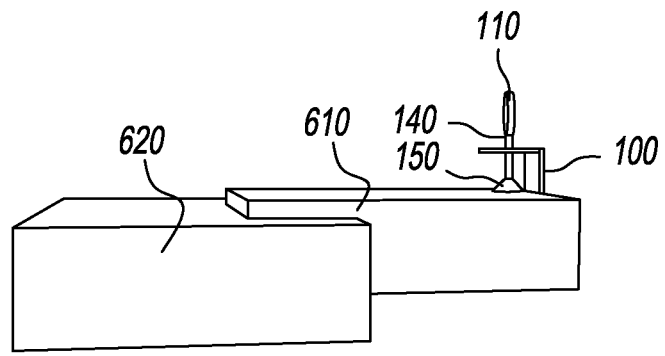
Figure 6D:
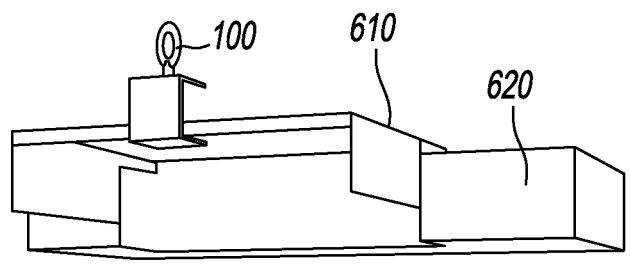
Figure 6C:
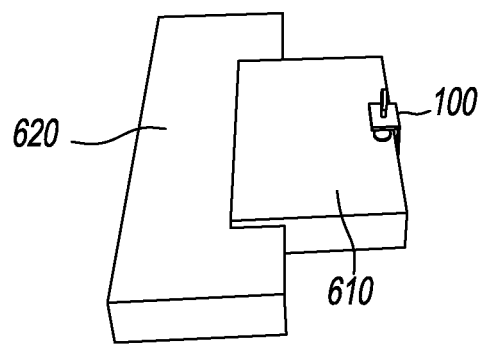
Figure 7A:
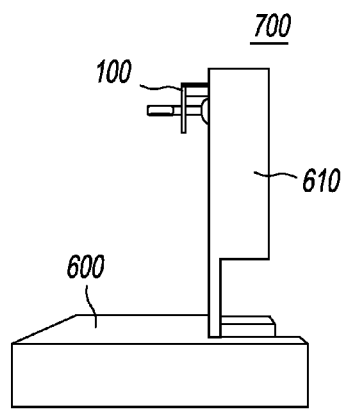
FIGS. 7A-7D depict various views of a deck guard clamp assembly attached to a horizontal wall of deck guard 610 according to an example embodiment.
Figure 7B:
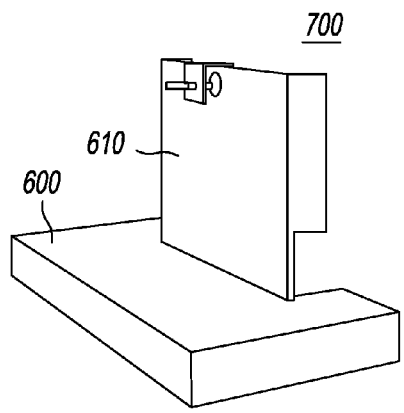
Figure 7C:
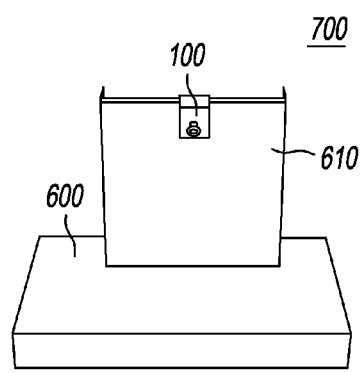
Figure 7D:
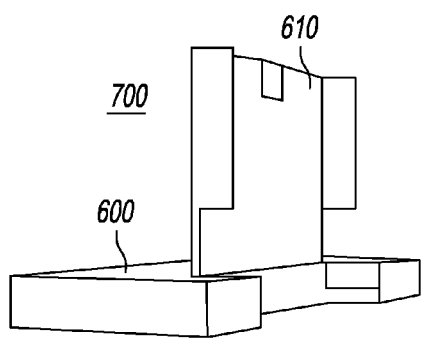

FIGS. 5A and 5B depict a fully assembled safety box 400 with two clips 300 inserted within the box 400. More specifically, FIG. 5A depicts a clip inserted within the anterior or first surface 410 of safety box 400, and FIG. 5B depicts a clip inserted within a second surface or posterior 420 of the safety box 400. Further, both of the clips 300 may be configured to freely swivel or turn while inserted within the box 400.

FIGS. 6A-D depict different views of deck guard clamp assembly 100 of FIG. 1 attached to deck guard 610. Deck guard clamp assembly 100 may be positioned such that the base 150 of the screw 110 is adjacent to the deck guard 610. In other words, the deck guard clamp assembly 100 is simple in design, but provides the strength necessary, required or desired to be fitted or clamped to any size deck guard 610 and to raise and lower it. The U-shaped design and vertical top-tapered 140 screw allows for the clip to be placed onto variously-sized deck guards 610 on both the horizontal (as shown) and a vertical face (not shown) of the deck guard 610. In other embodiments, a deck guard 610 may be swept back and may not be perpendicular to the mower deck (as shown). The versatility of the attachment points of the deck guard clamp assembly 100 allows for the clip to be attached to a vertical side of the deck guard 610, and be configured to account for pull force in a perpendicular motion. Furthermore, the round eyelet design 130 of screw 110 allows for free rotation of a clip 300 if attached to the round eyelet 300 and the safety box 400, as discussed above in FIGS. 5A and 5B.

FIGS. 7A-7D depict various views of deck guard clamp assembly 100 of FIG. 1 attached to horizontal wall 700 of deck guard 610, while deck guard 610 is in a raised position. In the raised position, round eyelet 300 may be accessible as an attachment point for clip 300 attached on the posterior or second side of the safety box 400.

Figure 8A:
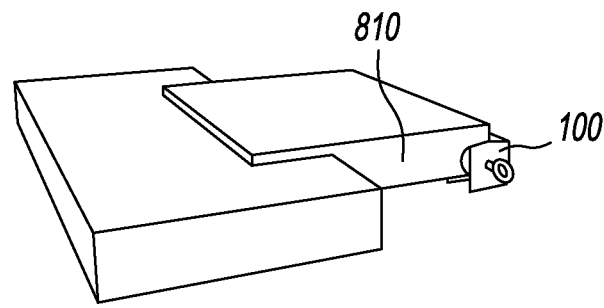
FIGS. 8A-8C depicts the attachment of a deck guard clamp assembly to a vertical wall of a deck guard according to an example embodiment.
Figure 8B:
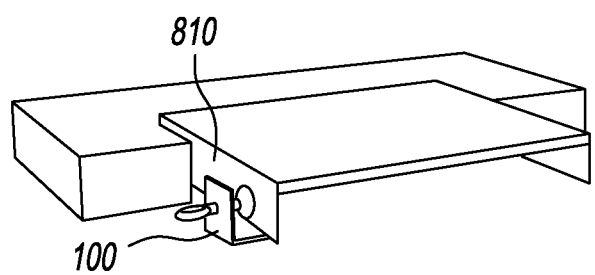
Figure 8C:
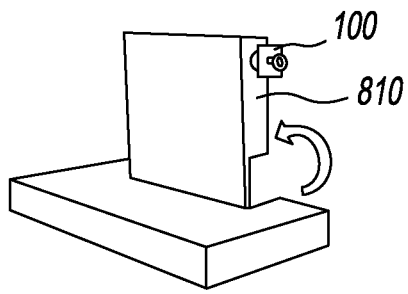

FIGS. 8A-8C depicts the attachment of deck guard clamp assembly 100 to a vertical wall 810 of a deck guard. More specifically, FIG. 8A is an isometric side view of deck guard clamp assembly 100 attached to vertical wall 810 of the deck guard, while the deck guard is in a first lowered position. FIG. 8B is an isometric front view of deck guard clamp assembly 100 attached to vertical wall 810 of the deck guard, while the deck guard is in a first or lowered position. FIG. 8C is an isometric view of deck guard clamp assembly 100 attached to vertical wall 810 of the deck guard, while the deck guard is in a second or raised position.

Figure 9A:
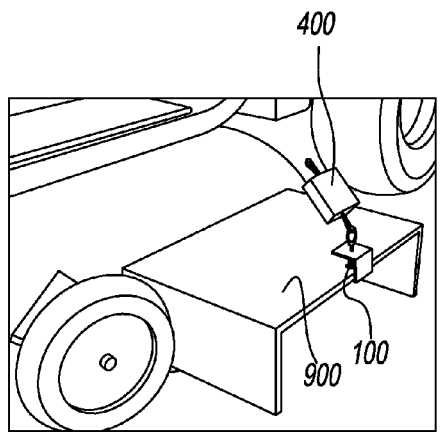
FIGS. 9A-9B depicts a close up view of the deck guard clamp assembly attached to safety box on a mower deck according to an example embodiment.
Figure 9B:
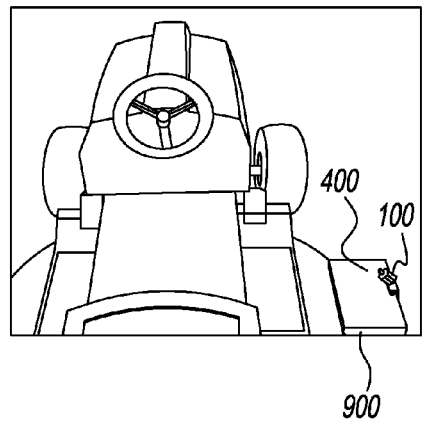

FIGS. 9A-9B depicts a close up view of the deck guard clamp assembly 100 attached to safety box 400 on mower deck 900. More specifically, FIG. 9A depicts a side view of the deck guard clamp assembly 100 attached to safety box 400 on mower deck 900, and FIG. 9B depicts a driver view of the deck guard clamp assembly 100 attached to safety box 400 on mower deck 900.

Figure 10A:
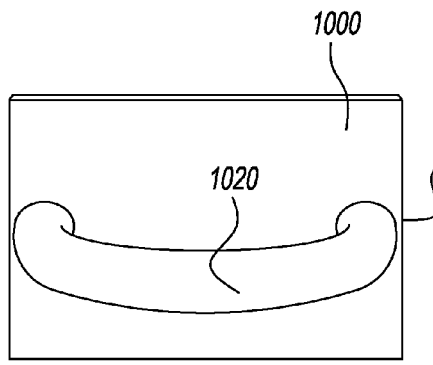
FIGS. 10A and 10B depict a mower housing mount that may be configured to be mounted or attached to a surface according to an example embodiment.
Figure 10B:
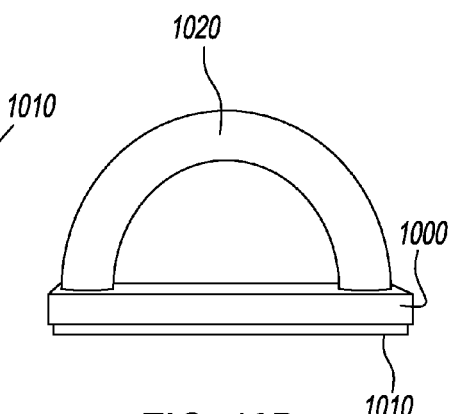

FIGS. 10A and 10B depict a mower housing mount 1000 that may be configured to be mounted or attached to any metal, plastic or otherwise desirable, required or necessary surface. The mower housing mount 1000 may be attached via either an adhesive backing 1010 or screw mount (not shown). The mower housing mount 1000 is screw mounted to a mower by inserting a screw through the mower housing mount 1000 and fixing it in the mower. A mower housing mount 1000 may have both an adhesive backing 1010 and a hole for insertion of a screw, in case the adhesive wears off or is otherwise undesirable. The mower housing mount 1000 may include a half circle attachment ring 1020 configured for quick coupling of a chain-link via a carabineer or any other hooking or latching mechanism.

FIGS. 11A-C depict mower housing mount 1000 mounted onto a first surface 1100. Attached to the chain link assembly may be a first carabineer 1115 configured to receive a chain link and a second carabineer 1110 configured to receive or hold a storage pouch 1120. The storage pouch 1120 may be configured to store excess chain if the guard is in a raised position.

Figure 12A:
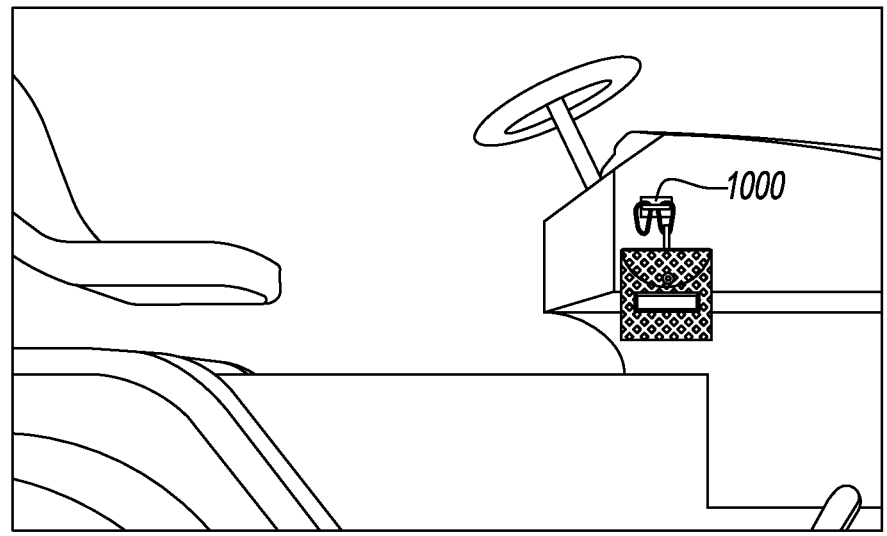
FIGS. 12A-B depict a mower housing mount mounted onto a first surface of a mower, a first carabineer, and a second carabineer supporting storage pouch according to an example embodiment.
Figure 12B:
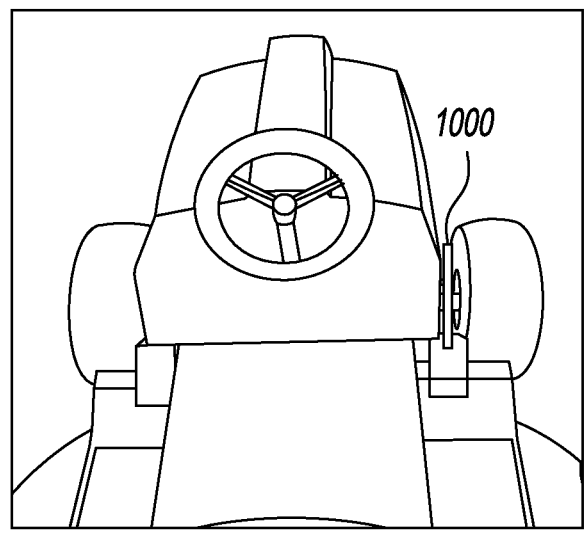

FIGS. 12A-B depict a mower housing mount 1000 mounted onto a first surface of a mower along with first carabineer 1105, and second carabineer 1110 supporting storage pouch 1120.

Figure 13:
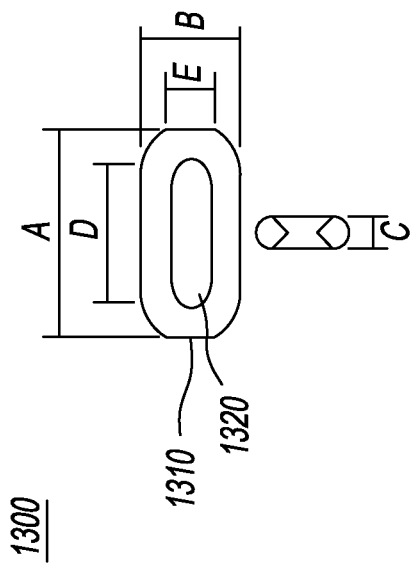
FIG. 13 depicts an individual link that comprises a chain link according to an example embodiment.

FIG. 13 depicts an individual link 1300 that comprises a chain link. More specifically, an outer surface 1310 of link 1300 may have a length of 1 and ½" and a width of ¾." An inner surface 1320 of the link 1300 may have a length of 1" and a width of ⅜." More so, link 1300 may have a depth of ⁷/₃₂" and have a tensile strength of 182 pounds. It should be noted that the above non-limiting dimensions and measurements are given by way of example, and each element may have a different shape or size. Further, a first edge of a chain comprised of a plurality of individual links 1300 may be configured to be connected to a carabineer within the anterior surface of safety box 400, while a second edge of the chain may be configured to be attached to mower housing mount via carabineer 1010.

Figure 14A:
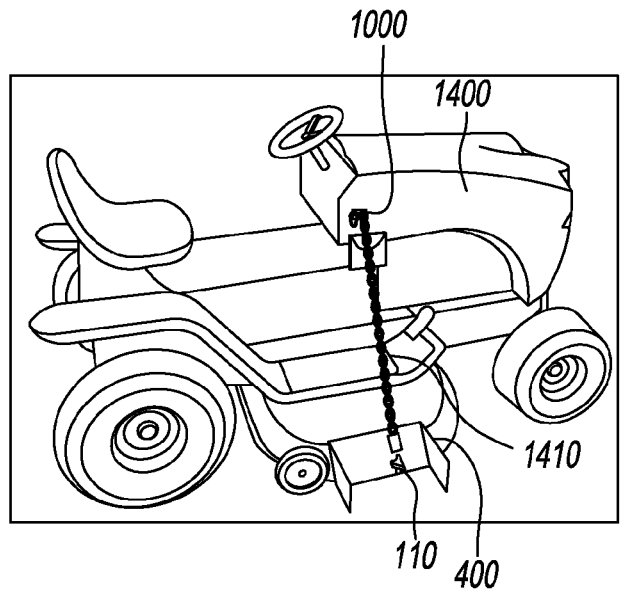
FIGS. 14A-B depict a side view and driver perspective view of a manual lawnmower deck guard positioner attached to a lawn mower according to an example embodiment.
Figure 14B:
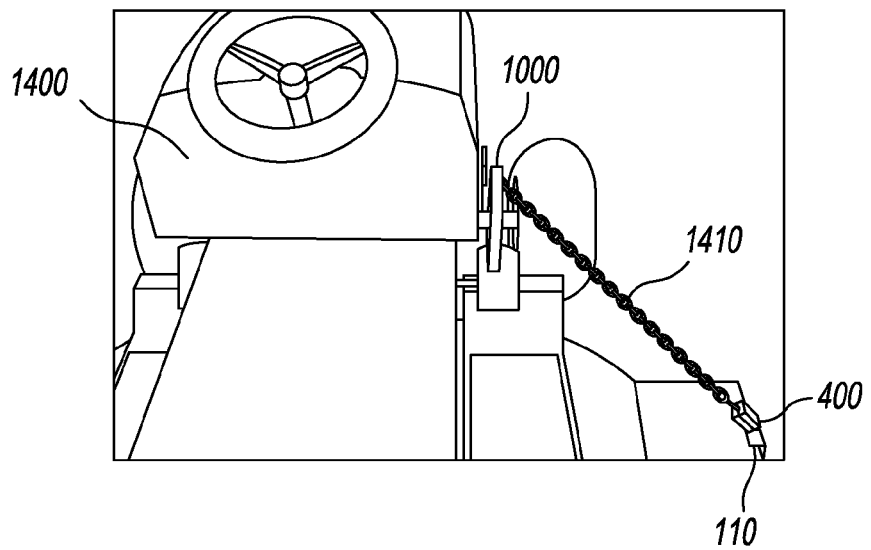

FIGS. 14A-B depict a side view and driver perspective view of a manual lawnmower deck guard positioner attached to a lawn mower 1400. More specifically, the deck guard clamp assembly 100 is attached to a horizontal surface of a deck guard in a lowered position, and the deck guard clamp assembly 100 is connected to the mower housing mount 1000 via the storage box 400 and chain 1410. It should be noted that the linkage assembly may not interfere with the operators ability to operate mower 1400. The ability to attach the linkage assembly to a mower in various locations allows the entire system to be positioned so that the mower can be operated normally without interference from the attached device, for a wide variety of mowers and other machines. For example, the mower housing mount 1000 may be attached to a mower below, behind, or above the leg area of a mower operator, allowing for free movement of the operator while keeping the device within easy reach for adjustment during operation while the operator is in a seated position (for seated mowers). In other example embodiments, the deck guard clamp assembly 100 and/or the mower housing mount 1000 may be disposed on different surfaces of the deck guard and the mower 1400, respectively. The system depicted allows a deck guard to be maintained at various heights, depending on where the chain 1410 is attached to the mower housing mount 1000. For example, it can be held fully open or only 50% open, etc. The guard may be raised partially or enough to clear an edge, but kept low enough to effectively deflect debris. The break-away safety device prevents snagging or entanglement regardless of the position of the deck guard.

Figure 15:
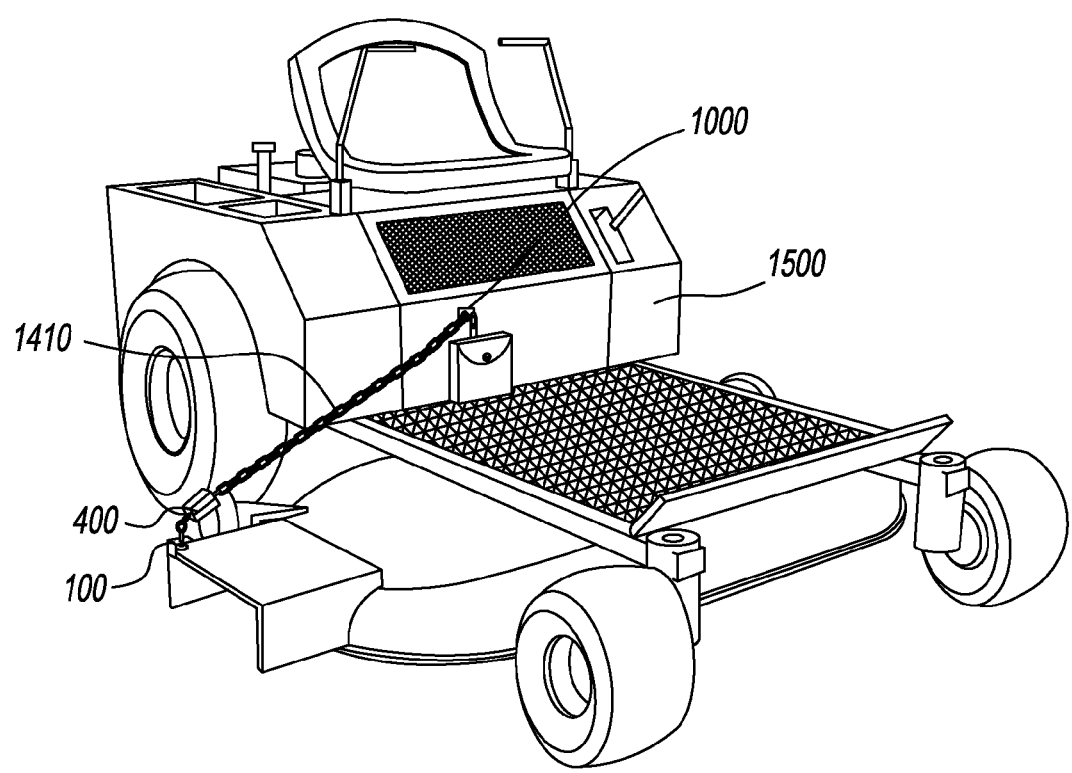
FIG. 15 depicts a perspective view of a manual lawnmower deck guard positioner attached to a zero-turn lawn mower according to an example embodiment.

FIG. 15 depicts a perspective view of a manual lawnmower deck guard positioner attached to a zero-turn lawn mower 1500. More specifically, the deck guard clamp assembly 100 is attached to a horizontal surface of a deck guard in a lowered position, and the deck guard clamp assembly 100 is connected to the mower housing mount 1000 via the storage box 400 and chain 1410. It should be noted that the linkage assembly may not interfere with the operators ability to operate mower 1500. In other example embodiments, the deck guard clamp assembly 100 and/or the mower housing mount 1000 may be disposed on different surfaces of the deck guard and the mower 150, respectively.

Figure 16A:
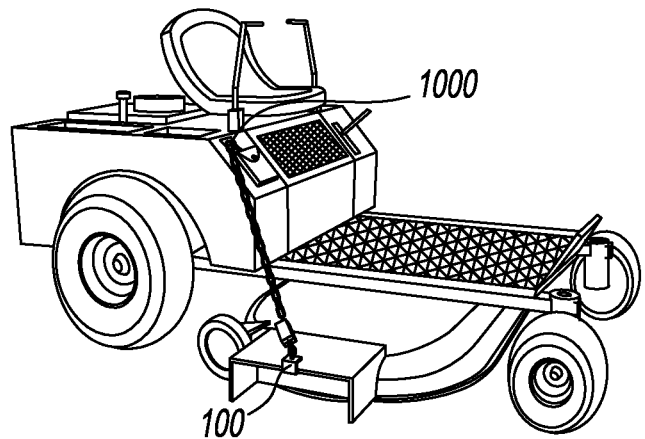
FIGS. 16A-C depict a manual lawnmower deck guard positioner attached to a zero-turn lawn mower with the deck guard clamp assembly and the mower housing mount disposed on different surfaces of a deck guard and the mower, respectively, according to example embodiments.
Figure 16B:
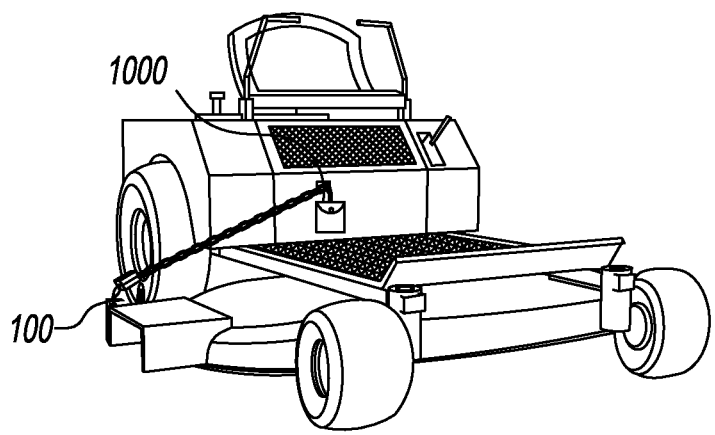
Figure 16C:
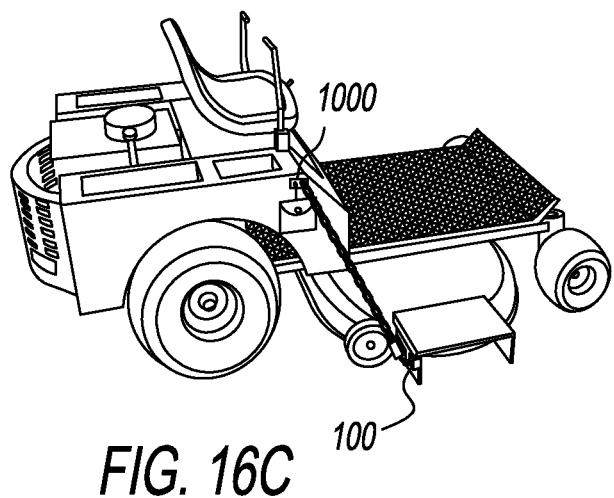

FIGS. 16A-C depict a manual lawnmower deck guard positioner attached to a zero-turn lawn mower 1500, the deck guard clamp assembly 100 and/or the mower housing mount 1000 may be disposed on different surfaces of a deck guard in a first or lowered position and the mower 1500, respectively. The placement or disposition of both the deck guard clamp assembly 100 and the mower housing mount 1000 as illustrated in FIGS. 16A-16C are shown by way of non-limiting examples, and may be positioned or placed on any required or desired surface of the deck guard and mower, respectively. It should be further noted that the linkage assemblies as shown in FIGS. 16A-C do not interfere with an operator's ability to operate the mower 1500.

Figure 17C:
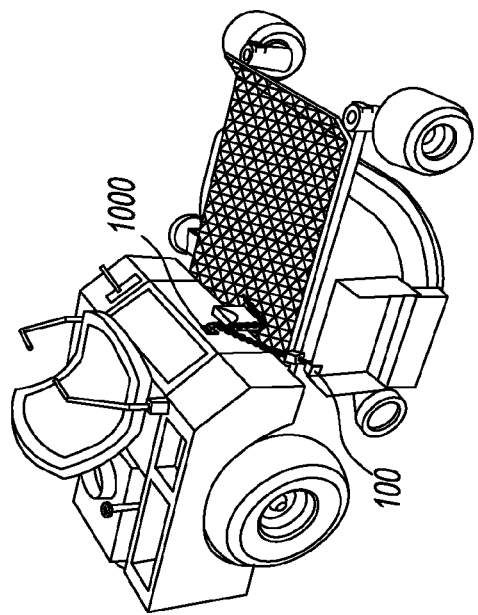
FIGS. 17A-D depict a manual lawnmower deck guard positioner attached to a riding and zero-turn lawn mower with the deck guard clamp assembly and the mower housing mount disposed on different surfaces of a deck guard and the mower, respectively, according to an example embodiment.
Figure 17D:
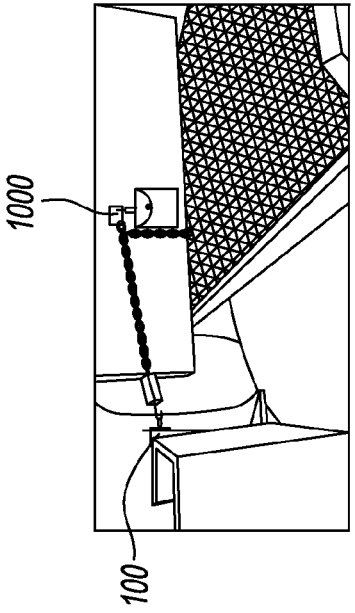
Figure 17A:
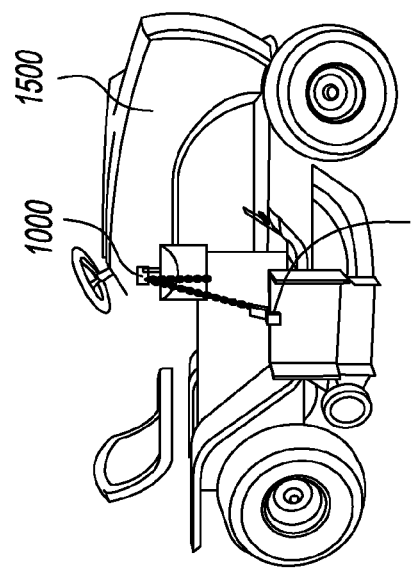
Figure 17B:
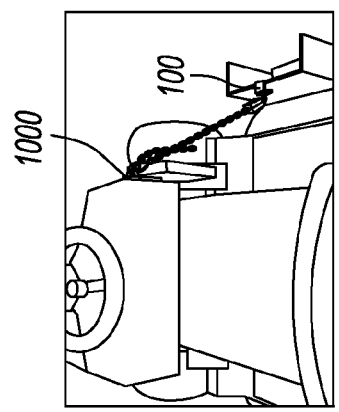
Figure 19B:
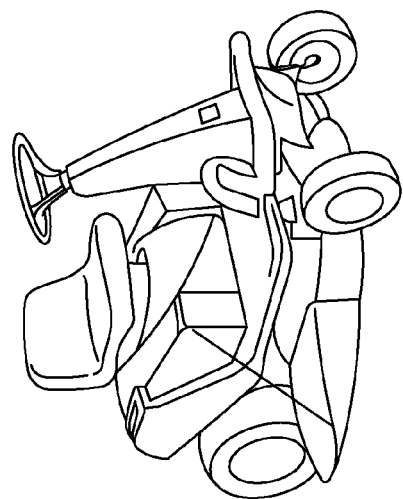
FIGS. 19A-D depict various example vehicles that a manual lawnmower deck guard positioner may be attached or positioned on according to example embodiments.
Figure 19D:
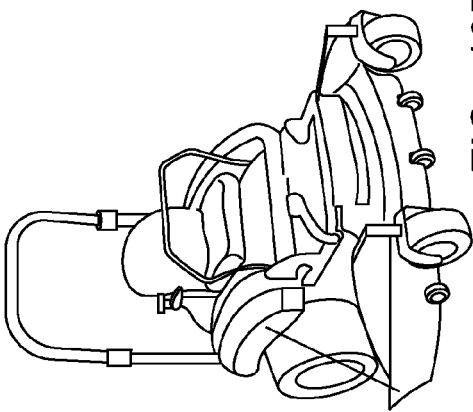
Figure 19A:
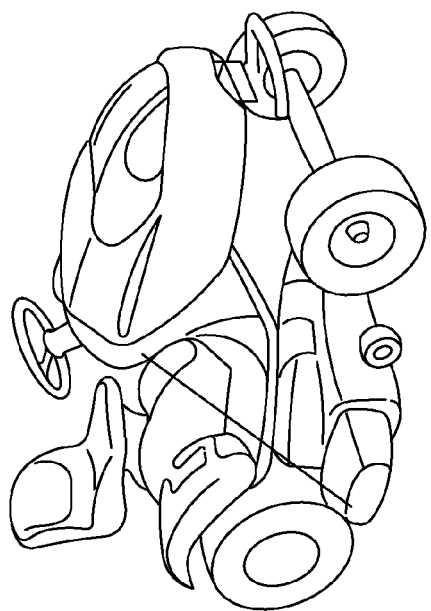
Figure 19C:
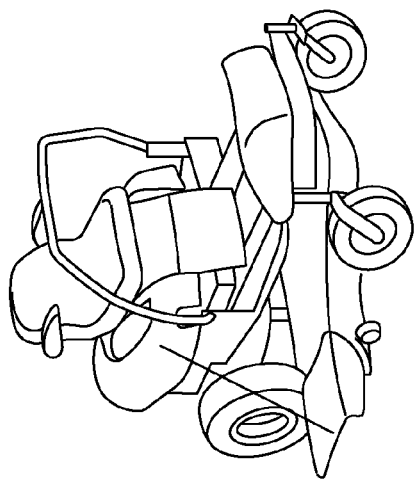

FIGS. 17A-D depict a manual lawnmower deck guard positioner attached to a zero-radius turn lawn mower and riding mower. The deck guard clamp assembly 100 and/or the mower housing mount 1000 may be disposed on different surfaces of a deck guard in a second or raised position and the mower 1500, respectively. The placement or disposition of both the deck guard clamp assembly 100 and the mower housing mount 1000 as illustrated in FIGS. 17A-C are shown by way of non-limiting examples, and may be positioned or placed on any required or desired surface of the deck guard and mower, respectively. It should be further noted that the linkage assemblies as shown in FIGS. 17A-D do not interfere with an operator's ability to operate the mower 1500.

FIG. 18 depicts the deck guard clamp assembly 100 and/or the mower housing mount 1000 disposed on different surfaces of a deck guard and the mower 1800, respectively. The free range of motion of placement of the deck guard clamp assembly 100 and safety box 400 allows for the mower housing mount 1010 to be positioned or placed on any surface of vehicle 1800. In at least one embodiment, the chain latch may be placed or positioned in an area that is easily reached by the operator of the vehicle 1800. The deck guard clamp assembly 100 may be attached anywhere on the discharge guard, for example on a vertical or horizontal face to provide leverage for lifting the guard into an upright position.

FIGS. 19A-D are various example vehicles that a manual lawnmower deck guard positioner may be attached or positioned on. However, the various vehicles depicted in FIGS. 19A-D are shown by way of non-limiting examples, and a manual lawnmower deck guard positioner may be mounted on any vehicle with a rotatable deck guard.

Figure 20:
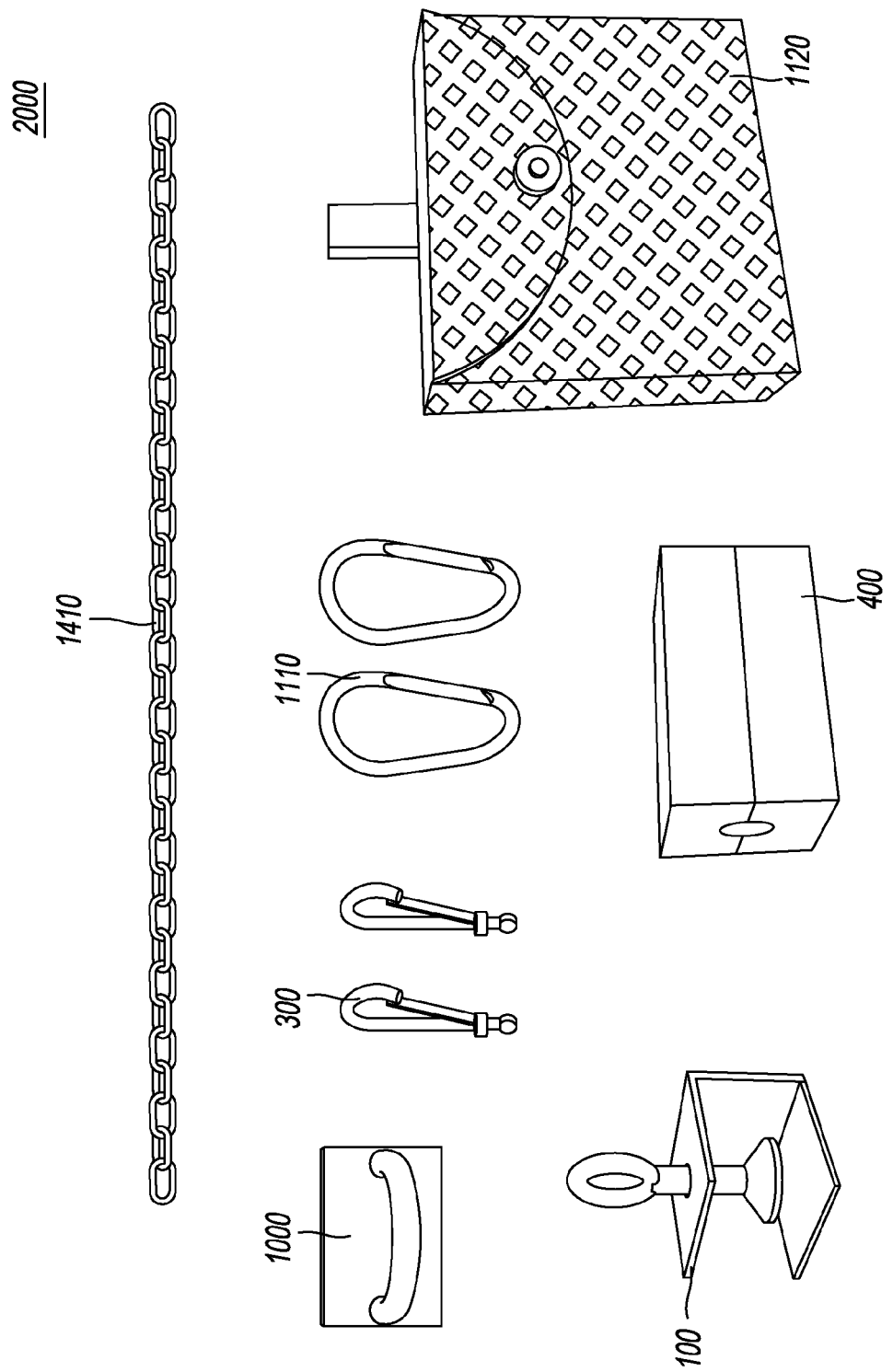
FIG. 20 depicts an inventory of parts that may comprise an assembly to be sold at a retail store according to an example embodiment.

FIG. 20 depicts an inventory of parts that may comprise an assembly 2000 to be sold at a retail store. More specifically, the assembly may include a plastic chain 1410, plastic/metal attachment ring 1000, plastic swivel snap clips 300, plastic/metal carabineers 1110, plastic/metal deck guard clamp assembly with a loop head screw 100, a safety box 400, and a storage bag 1120 with a strap. The storage bag may be used to connect to the housing mount and store excess chain length. All components of the device may be plastic, metal, metal composite, or any suitable material or a combination thereof. Plastic components provide sufficient strength and durability for most applications and are inexpensive to manufacture.

Figure 21:
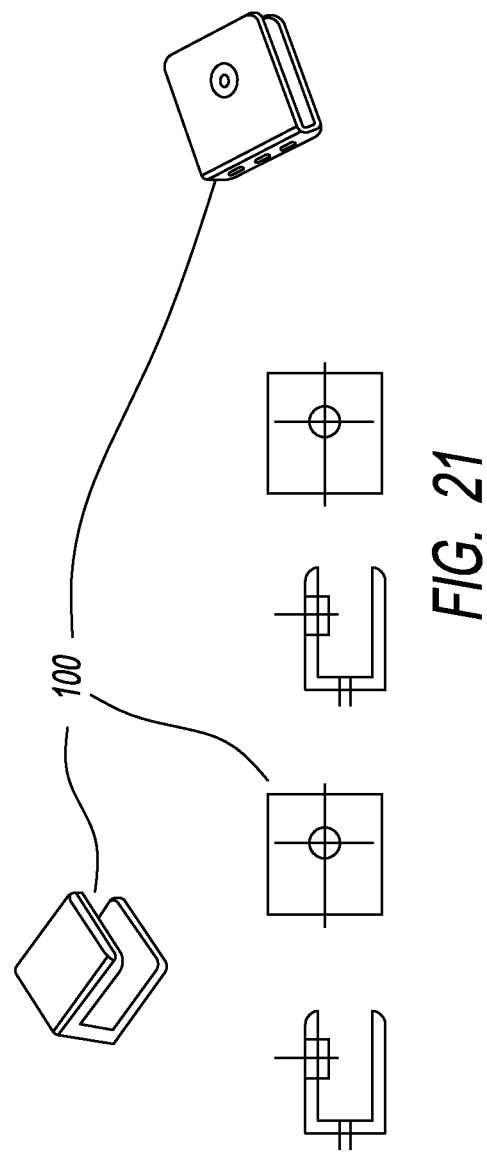
FIG. 21 depicts various shapes and sizes that may be used for a deck guard clamp assembly according to an example embodiment.

FIG. 21 depicts various shapes and sizes that may be used for deck guard clamp assembly 100. However, the various deck guard clamp assemblies depicted in FIG. 21 are shown by way of non-limiting examples, and the deck guard clamp assembly may be any desired or required shape or size.

FIG. 22 depicts various shapes and sizes that may be used for attachment clip 1000. However, the various for attachment clip 1000 depicted in FIG. 22 are shown by way of non-limiting examples and the attachment clip 1000 may be any desired or required shape or size.

FIG. 23 depicts various shapes and sizes that may be used for bag 1120. However, the various for bags depicted in FIG. 24 are shown by way of non-limiting examples, and the bags may be any desired or required shape or size.

FIG. 24 depicts various shapes and sizes that may be used for carabineers 1110. However, the various shapes and sizes for carabineers depicted in FIG. 24 are shown by way of non-limiting examples, and the carabineers utilized may be any desired or required shape or size.

Figure 25:
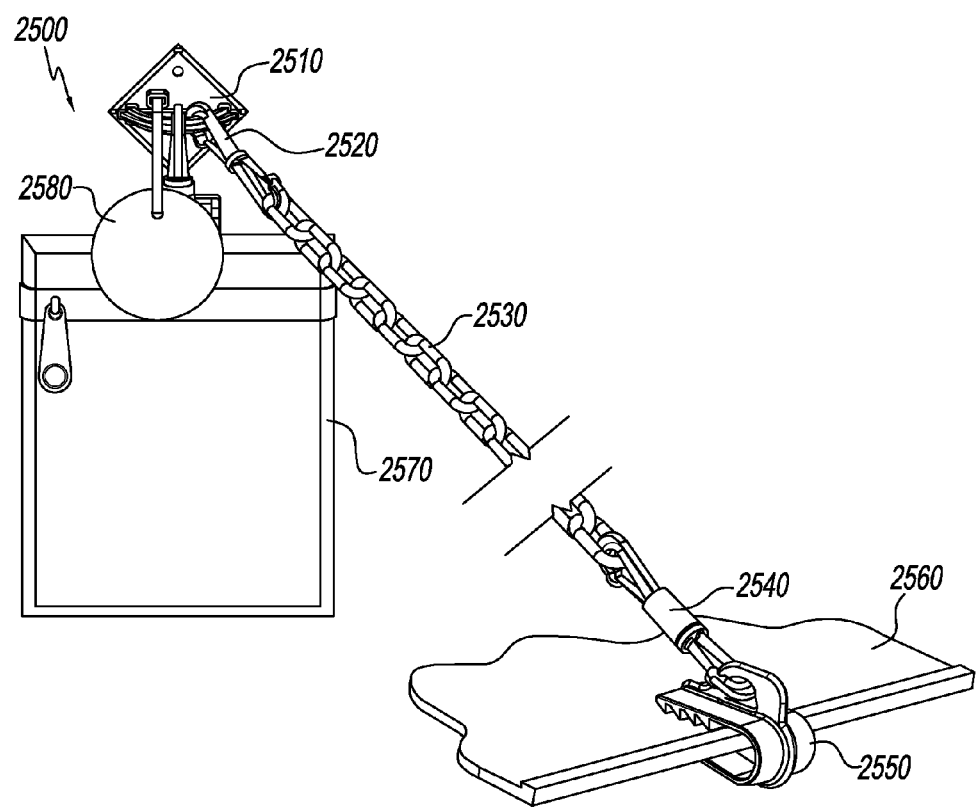
FIG. 25 depicts a manual lawnmower deck guard positioner according to an example embodiment.

FIG. 25 depicts a manual lawnmower deck guard positioner 2500 according to an example embodiment. The positioner is a mechanical device for linking a riding lawn mower's (conventional or zero-radius turn) deck guard to its housing in a fashion that allows the mower operator to manually raise and lower the deck guard. The positioner allows the deck guard to be positioned in a fully raised position, fully lowered (resting) position, or at some position in between. The positioner also allows for positioning of the deck guard at any of these points in both a fixed and temporary condition.

The positioner can be conceptually divided into two portions, a top assembly and a lower assembly, connected by a chain 2530 or other link. The lower assembly includes deck guard clamp assembly 2550 (similar in function to clamp assembly 100) attached to mower deck guard 2560 and connected to chain 2530 by break-away safety snap-clip 2540 (similar in function to safety release assembly 200). The top assembly includes mower housing mount 2510 (similar in function to mower housing mount 1000), double-sided snap-clip 2520 (used in place of carabiner 1110) connecting chain 2530 to the mower housing mount 2510, and storage pouch 2570 (similar in function to storage bag 1120) also connected to mower housing mount 2510. Warning label 2580 may also be attached to mower housing mount 2510, for example by a zip tie. The warning label 2580 may be a UV resistant plastic warning tag for durability with outdoor use. The warning label may be permanently attached in a conspicuous place to provide the user of the deck guard positioner with warning/caution statements regarding the use of the product.

At a fully lowered (resting) deck guard position, the chain 2530 may extend its full length between mower housing mount 2510 and deck guard clamp assembly 2550. Reducing the length of the chain that extends between these two points (e.g. by connecting double-sided snap-clip 2520 to an intermediary link in chain 2530 rather than to a terminal link) forces the mower deck guard 2560 into a raised position. The amount of chain 2530 extending between mower housing mount 2510 and deck guard clamp assembly 2550 can be fixed at any desired length by attaching the chain link at the desired length/deck guard angle to the double sided snap-clip 2520 attached to the mower housing mount 2510.

The mower deck guard 2560 can be raised temporarily by grasping and pulling the linkage chain 2530 towards the operator. This force causes the mower deck guard 2560 to raise to a degree directly correlated with the distance the chain is pulled. Once the linkage chain 2530 is released, the mower deck guard 2560 automatically returns to the fully lowered or resting position (or whatever fixed position is dictated by the length of chain extending between the mower deck guard 2560 and mower housing mount 2510).

Figure 26A:
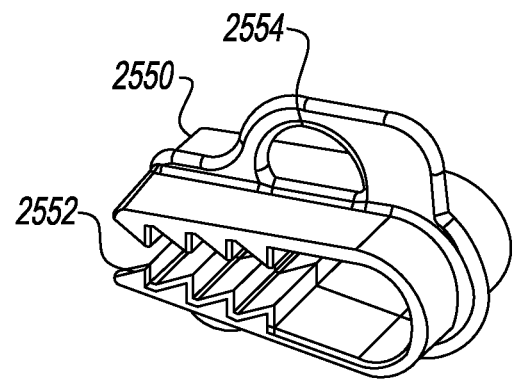
FIGS. 26A-B depict a deck guard clamp assembly according to an example embodiment.
Figure 26B:
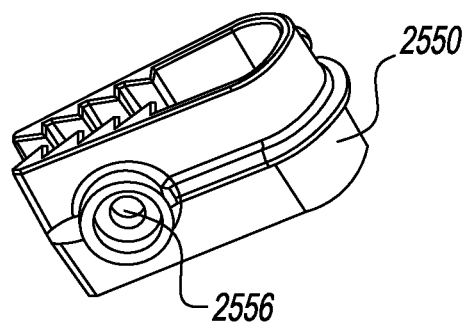

FIGS. 26A-B depict a deck guard clamp assembly 2550 according to an example embodiment. Deck guard clamp assembly 2550 serves the same purpose as deck guard clamp assembly 100 described previously. Deck guard clamp assembly 2550 is a molded alligator style plastic clamp with raised sharp edged "teeth" 2552 for non-permanent attachment to a deck guard. There is an orifice 2554 on the raised spine of the deck guard clamp which serves as the attachment point for one side of the safety break-away snap clip 2540. There is a small orifice (screw port) 2556 on the bottom side of the clamp for optional permanent attachment to the deck guard 2560 using a standard metal screw.

FIGS. 27A-B depict a break-away safety snap clip 2540 according to an example embodiment. Two molded plastic clips 2544 have barrel shaped bottoms 2542, 2546. One barrel 2546 has a raised lip section 2548 on the inside to fit (snap) into a grooved portion on the inside of the other barrel 2542. When snapped together, the two snap clip sections form the break-away safety snap clip 2540. One clip 2544 of the break-away safety snap clip 2540 attaches to the orifice 2554 on the top side of the deck guard clamp assembly 2550 and the other clip 2544 attaches to the chain 2530. The break-away safety snap clip 2540 acts as a safety mechanism, allowing the two snap clips to break apart in the event of snagging or entanglement of the linkage assembly. Once the break-away safety snap clip 2540 is broken apart, the linkage assembly is disengaged and the mower deck guard returns automatically to the lowered or normal position. The break-away safety snap clip 2540 is reusable, with the ability to be joined back together once the link is broken.

FIG. 28 depicts a linkage chain 2530 according to an example embodiment. The chain 2530 may be made of UV-resistant plastic for durability in outdoor use and links the mower deck guard 2560 to the double-sided snap-clip 2520. The chain 2530 has individual links that allow positioning the mower deck guard 2560 between a normal resting (down) position and a fully raised position. In alternative embodiments, a cable, cord, or other link may be used instead of a chain, and may have a series of attachment points that substitute for the links for ease of positioning.

Figure 29:
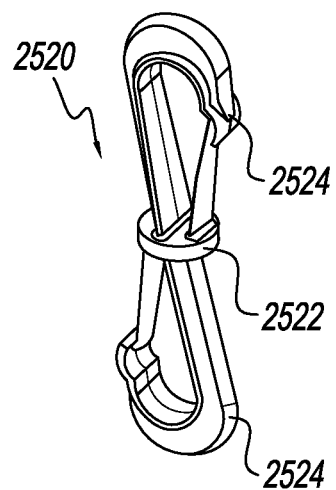
FIG. 29 depicts a double sided snap-clip according to an embodiment.

FIG. 29 depicts a double sided snap-clip 2520 according to an embodiment. The double sided snap-clip 2520 is molded as one solid unit comprised of two fixed snap clips 2524 joined by a central plastic point 2522. The snap clips are molded in positions 180° relative to each other. This allows for dual attachment to the mower housing mount 2510 and the chain 2530. Having clips on both sides allows the clip receiving the chain link to be easily opened and closed without any interference from the mower housing mount 2510, the loop of which is held by the opposite clip.

Figure 30:
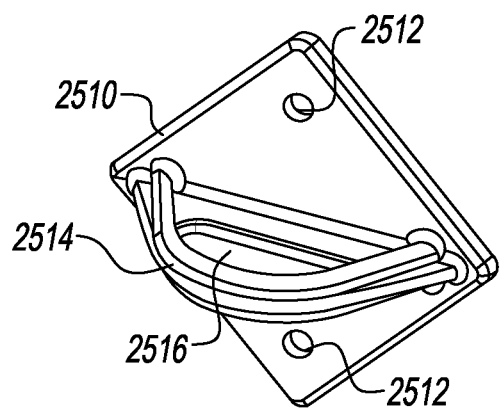
FIG. 30 depicts a mower housing mount, according to an embodiment.

FIG. 30 depicts a mower housing mount 2510, according to an embodiment. Mower housing mount 2510 has a molded plastic 1.5" square with a raised half-moon loop 2514 forming an aperture 2516. The loop 2514 is the attachment point for one side of the double sided snap-clip 2520, the warning label 2580, and the storage pouch 2570. Two orifices 2512 center positioned at the upper and lower section of the Mount are for optional permanent attachment to a mower housing standard metal screws.

Figure 31:
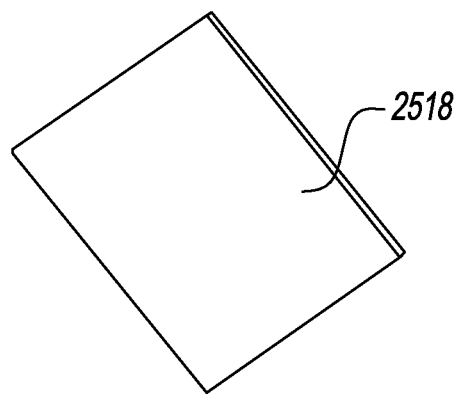
FIG. 31 depicts a piece of double-sided foam tape for use with the mower housing mount of FIG. 30, according to an embodiment.

FIG. 31 depicts a piece of double-sided foam tape 2518 for use with the mower housing mount 2510 of FIG. 30, according to an embodiment. Double-sided industrial grade/UV resistant foam tape attaches the mower housing mount 2510 to a riding lawnmower and provides long-lasting, durable adhesion with outdoor use. The foam tape may be for example 1.5" square. The mount 2510 can be attached to metal or plastic surfaces on the lawnmower with the double-sided tape 2518.

Figure 32:
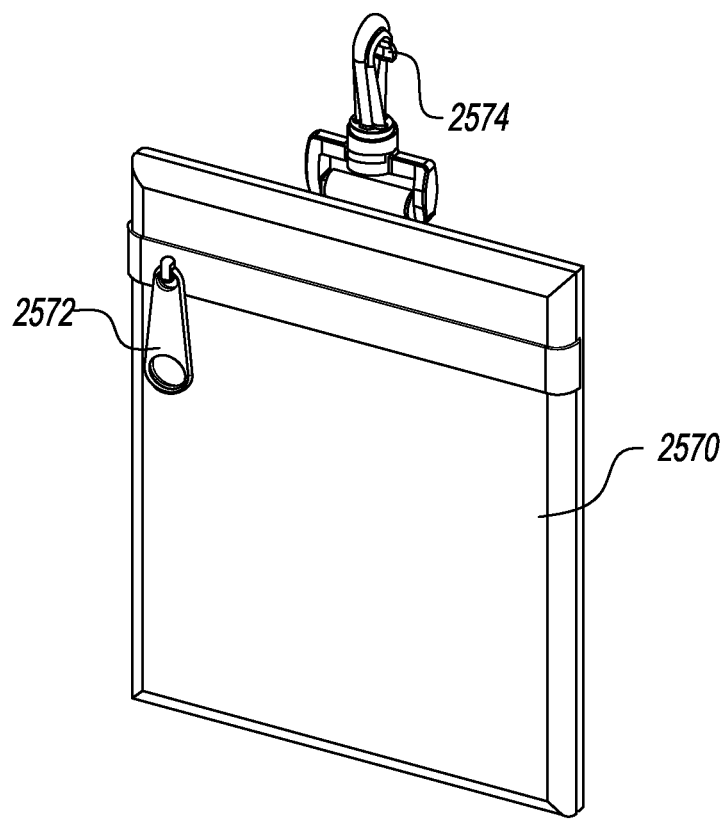
FIG. 32 depicts a storage pouch according to an example embodiment.

FIG. 32 depicts a storage pouch 2570 according to an example embodiment. The pouch is a standard non-woven zippered pouch having zip opening 2572 with snap clip 2574 for attachment to the mower housing mount 2510. Zippered pouch may be used as a repository for slack/excess chain when the mower deck guard 2560 is in a raised position and/or used as a storage bag for the entire manual lawnmower deck guard positioner 2500 when not in use. In other embodiments, other fasteners/opening mechanisms may be used in place of the zipper 2572, such as snaps, clips, etc.

Figure 33:
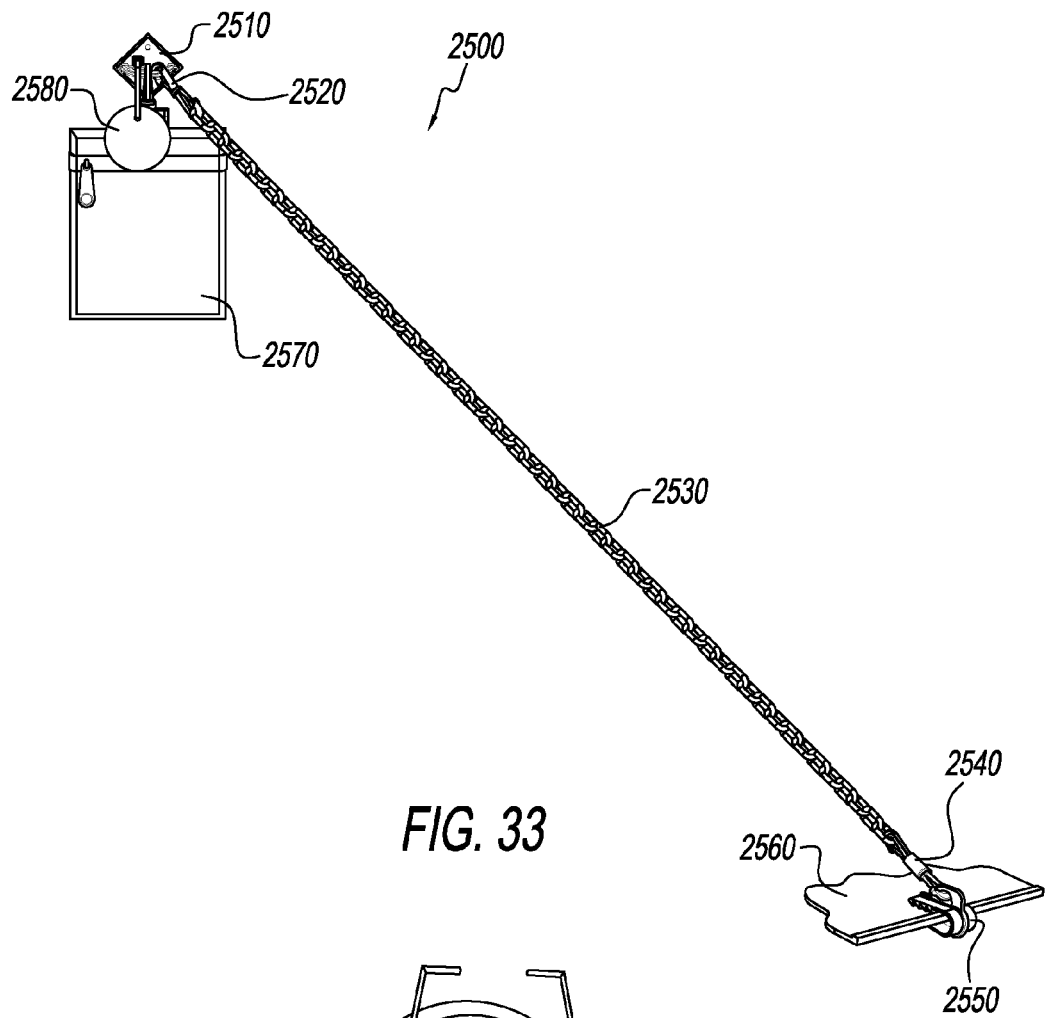
FIG. 33 depicts a manual lawnmower deck guard positioner according to an example embodiment.

FIG. 33 depicts a manual lawnmower deck guard positioner 2500 according to an example embodiment.

Figure 34:
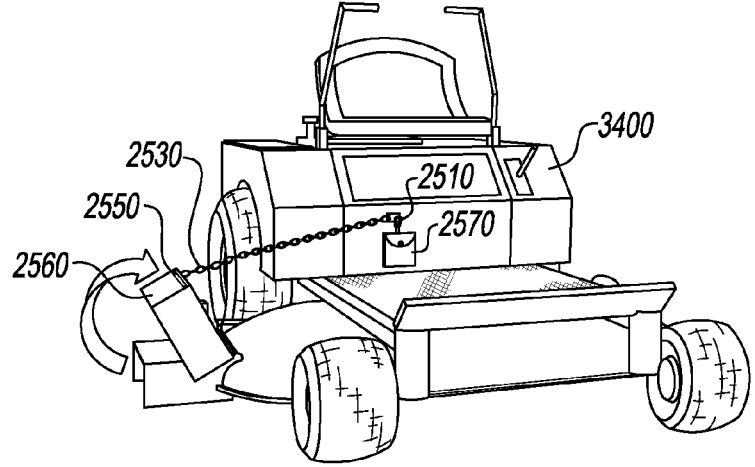
FIG. 34 depicts a manual lawnmower deck guard positioner attached to a lawn mower, according to an example embodiment.

FIG. 34 depicts a manual lawnmower deck guard positioner 2500 attached to a lawn mower 3400, according to an example embodiment.

Although embodiments depicted illustrate use of the positioner on a riding mower, it may similarly be used with a push or other lawn mower or other powered lawn machine (brush hog, etc.). Attachment mechanisms may be adjusted according to the available attachment points on the machine. For example, if only a tubular frame is available for attachment of the connector for manipulation by a user, the attachment mechanism may encircle and clamp onto the tube frame for a secure attachment.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments. While the embodiments may be illustrated by using a particular embodiment, this is not and does not limit the invention to any particular embodiment and a person of ordinary skill in the art will recognize that additional embodiments are readily understandable and are a part of the example embodiments.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What I claim is:

1. An apparatus for raising and lowering a platform, particularly a mower deck guard, the apparatus comprising:
 a platform attachment assembly configured for attachment to a movable platform;
 a housing mount configured to be attached to a riding machine surface; and
 a linkage assembly comprising a break-away safety mechanism and configured to connect the platform attachment assembly to the housing mount and to thereby hold the movable platform in a raised position, wherein
 the break-away safety mechanism is configured to break apart, breaking the linkage assembly and thereby the connection between the platform attachment assembly and the housing mount, when a tensile force is applied to the linkage assembly due to snagging or entanglement,
 the break-away safety mechanism comprises first and second clips facing in opposite directions and removably connected at their bases, and
 the bases of the first and second clips having a circular cross-section in a direction perpendicular to a direction of the tensile force, the circular cross-section enabling a full range of rotational swiveling and turning motion of the clips with respect to the platform attachment assembly.

2. The apparatus of claim 1, wherein the first clip base comprises an opening and at least one of a groove and a lip and the second clip base comprises a portion configured to be inserted in the opening and comprising at least one of a groove and a lip configured to mate with the at least one of a groove and a lip of the first clip base.

3. The apparatus of claim 1, wherein the linkage assembly further comprises a double-sided clip connecting the linkage assembly to the housing mount, the double-side clip forming an S-shape having rotating clips in opposing openings of the S-shape.

4. The apparatus of claim 1, wherein the linkage assembly comprises chain links.

5. The apparatus of claim 4, wherein the linkage assembly connects to the housing mount and the platform attachment assembly with clips.

6. The apparatus of claim 1, wherein the housing mount comprises an attachment loop configured to secure the linkage assembly.

7. A riding lawn care machine comprising a movable platform and the apparatus for raising and lowering a deck guard of claim 1.

8. The apparatus of claim 1, wherein the movable platform is a lawnmower deck guard and the riding machine surface is the outer surface of a lawnmower.

9. The apparatus of claim 1, wherein the platform attachment assembly comprises a clamp assembly configured to be clamped to an edge of the movable platform.

10. The apparatus of claim 9, wherein the clamp assembly comprises alligator teeth to prevent accidental dislodgement of the clamp assembly from the movable platform.

11. The apparatus of claim 9, wherein the clamp assembly is U-shaped.

12. The apparatus of claim 1, wherein the linkage assembly is configured to raise the movable platform attached to the platform attachment assembly connected to the linkage assembly when pulled away from the platform attachment assembly and towards the housing mount and when the movable platform is in a less than fully raised position.

13. The apparatus of claim 1, wherein the linkage assembly is configured to lower the movable platform attached to the platform attachment assembly connected to the linkage assembly when moved towards the platform attachment assembly and away from the housing mount and when the movable platform is in a less than fully lowered position.

14. The apparatus of claim 1, further comprising a storage bag configured to attach to the housing mount and to store at least a portion of the linkage assembly.

15. The apparatus of claim 1, wherein the housing mount is attached to the riding machine surface with an adhesive.

16. The apparatus of claim 1, wherein the break-away safety mechanism connects the linkage assembly to the platform attachment assembly.

17. A movable platform positioning method, comprising:
attaching a platform attachment assembly to a movable platform;
attaching a housing mount to a riding machine surface;
connecting the platform attachment assembly to the housing mount with a linkage assembly comprising a break-away safety mechanism and thereby holding the movable platform in a raised position, the break-away safety mechanism comprising first and second clips facing in opposite directions and removably connected at their bases, the bases of the first and second clips having a circular cross-section in a direction perpendicular to a direction of the tensile force, the circular cross-section enabling a full range of rotational swiveling and turning motion of the clips with respect to the platform attachment assembly;
wherein the break-away safety mechanism is configured to break the connection between the platform attachment assembly and the housing mount when a tensile force is applied to the linkage assembly as a result of snagging or entanglement.

18. The method of claim 17, further comprising pulling the linkage assembly away from the platform attachment assembly and towards the housing mount and thereby raising the movable platform.

19. The method of claim 17, further comprising moving the linkage assembly towards the platform attachment assembly and away from the housing mount and thereby lowering the movable platform.

* * * * *

UNITED STATES PATENT AND TRADEMARK OFFICE
CERTIFICATE OF CORRECTION

PATENT NO. : 9,439,347 B2  
APPLICATION NO. : 13/868038  
DATED : September 13, 2016  
INVENTOR(S) : Michael Oehlsen Page 1 of 1

It is certified that error appears in the above-identified patent and that said Letters Patent is hereby corrected as shown below:

On the Title Page

Item [71], [72], delete incorrect "WI" and insert --WV--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*